United States Patent
Vocaturo

[11] Patent Number: 6,054,775
[45] Date of Patent: Apr. 25, 2000

[54] ACOUSTICALLY RESONANT INTERNAL COMBUSTION ENGINE-GENERATOR (A.R.E.G.)

[76] Inventor: Joseph M. Vocaturo, 93 Hempstead Rd., Hamilton, N.J. 08610

[21] Appl. No.: 09/038,487

[22] Filed: Mar. 7, 1998

[51] Int. Cl.$^7$ ........................................................ H02P 9/04
[52] U.S. Cl. ............................ 290/1 A; 290/1 R; 290/40 C; 322/3
[58] Field of Search ..................... 290/1 R, 40 C, 290/1 A; 322/3; 73/645, 659

[56] References Cited

U.S. PATENT DOCUMENTS

| | | | |
|---|---|---|---|
| 4,599,551 | 7/1986 | Wheatley et al. | 322/2 R |
| 5,263,341 | 11/1993 | Lucas | 62/498 |
| 5,515,684 | 5/1996 | Lucas et al. | 62/6 |
| 5,659,173 | 8/1997 | Putterman et al. | 250/361 C |
| 5,892,293 | 4/1999 | Lucas | 290/1 R |

Primary Examiner—Nicholas Ponomarenko

[57] ABSTRACT

An electrical power generating apparatus is developed as an internal combustion acoustically resonant engine. It has left and right acoustic formations (39), which are formed into the apparatus closure and constitute a multiple degree of freedom vibratory system. A shuttle (12) is suspended inside and between these acoustic formations and reciprocating when two fuel injectors (35), which are positioned symmetrically at each end of said shuttle in the body of said closure, do their alternate operation and create oscillations of said shuttle. A linear generator rotor (30) is attached to said shuttle with magnetic elements producing a magnetic field when rotor reciprocates together with the shuttle. A linear generator stator with windings is attached to said closure. The fuel injectors create mechanical oscillations of the shuttle, the shuttle creates oscillations of the rotor, and magnetic field of said rotor crosses the windings of the stator for generating of an electrical energy.

34 Claims, 9 Drawing Sheets

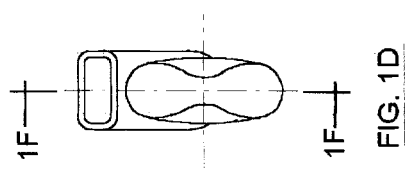
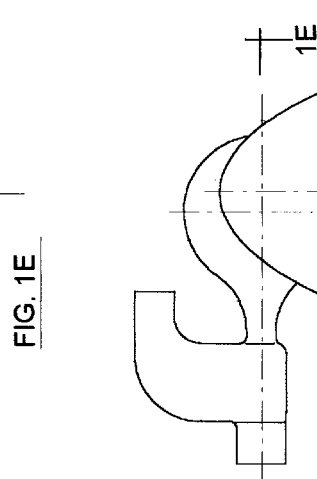
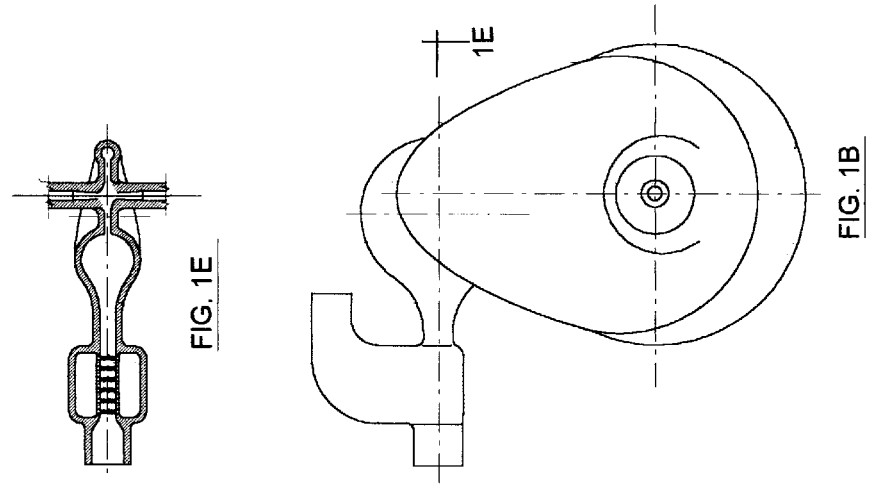
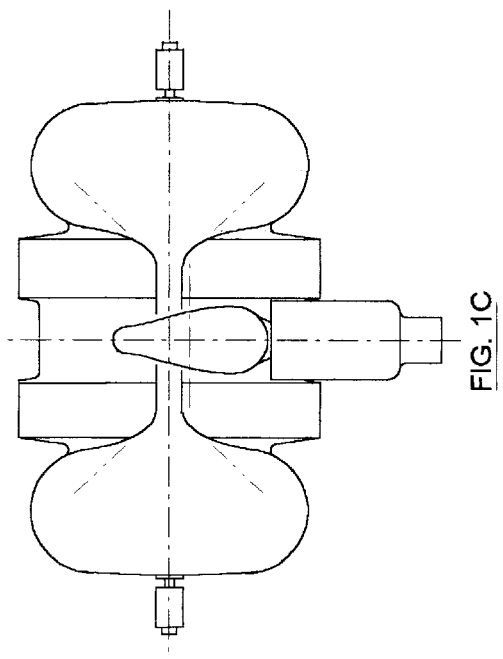
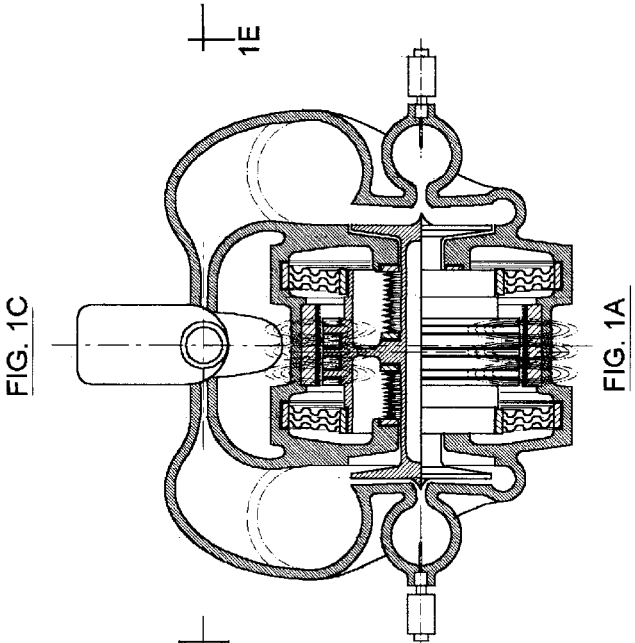
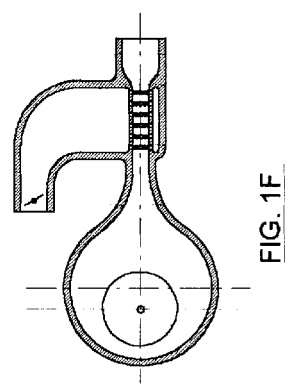

PARTIAL FIG. 2A ENLARGED

ALTERNATE PARTIAL VIEW

ACOUSTICALLY RESONANT INTERNAL COMBUSTION ENGINE-GENERATOR (A.R.E.G.)

BACKGROUND—FIELD OF INVENTION

This invention relates to heat engines as extant in motor vehicles and aircraft, as well as the overall drive train system as extant in motor vehicles.

BACKGROUND—DESCRIPTION OF PRIOR ART

The conventional four cycle internal combustion piston heat engine (ICE) as extant in motor vehicles, and in aircraft until the introduction of the turbojet engine (JET ENGINE), has not changed in its principles of operation since its introduction around the turn of the twentieth century. The ICE is characterized thermodynamically as utilizing intermittent nonflow processes.

Efforts to fundamentally replace the ICE include the many versions of the Free Piston Engine, and the Wankel, all of which have failed to displace the ICE. Efforts to replace the ICE with a Gas Turbine also have been unsuccessful. The purely Electric Car is probably getting the most attention. Hybrid systems wherein energy storage devices (batteries, fuel cells, and even flywheels) are combined with and/or complimented by an ICE or a Gas Turbine are currently under evaluation. Some of the negative factors associated with the ICE and with the newer drive options under serious consideration follow:

(a) ICE's are mechanically complex and characterized by high mechanical frictional losses. The mechanical complexities result in an expensive product with high component wear rates. As a result of high wear rates ICE's typically have a service life of from 150 to 200 thousand miles. During this modest lifetime performance continuously degrades. This results in lowered efficiency which in turn implies an increase in environmental deterioration. Like the ICE, the conventional drive train associated with the ICE is mechanical intensive, and is therefore itself the source of high friction losses, is subject to high wear rates, and is costly.

(b) The fact that every ICE requires a lubricating oil change of from 4 to 6 quarts every 3 to 4 thousand miles consumes that much fresh oil and transforms it into waste in the form of dirty and depleted oil, or products of combustion polluting the atmosphere.

(c) In the ICE, given the number of cylinders, the frequency of heat addition and hence the time average maximum power developed is largely determined by the speed at which the massive mechanical components can be articulated without incurring component damage and accelerated wear. Increasing the number of cylinders at a given RPM increases the frequency of heat input but also increases the complexity, the weight, and the cost.

(d) The purely electric vehicle has yet to be graced with the breakthroughs in battery or fuel cell technology necessary to render it ubiquitous. Currently batteries and fuel cells, as required for satisfactory power and range are too heavy, too costly, and in the case of batteries require too long a charging time.

(e) The premise of the Hybrid System (according to recent definitions) is that of drawing energy from a battery, fuel cell, or flywheel, and then switching to the direct drive of an ICE or a gas turbine when the storage device is depleted, or, alternatively, employing both the engine and the energy storage device simultaneously when power is to be maximized. The problem with these systems resides in the fact that they are parallel systems which are inherently complex and expensive.

The transition from ICE's to Jet Engines in propelling aircraft has of course been notably successful. It is submitted that the fundamental reason for this success resides in the fact that the Jet Engine implements more complex and sophisticated thermodynamic processes in place of mechanical complexity and the relatively simple thermodynamics of intermittent nonflow processes. The thermodynamic processes of the Jet Engine as well as the Gas Turbine are characterized as within the domain of steady state flow processes. The engineering demands are much greater but the results are dramatically enhanced. On the other hand the Jet Engine, and the Gas Turbine as implemented in experimental motor vehicles, also reveal shortcomings. Some of these follow:

(f) Using steady state flow processes to raise the pressure of the oxidizing agent (air) requires a physically sophisticated high speed mechanical compressor.

(g) In order to avoid the excessively high soak temperatures in some of their component's, it is necessary to pass a huge amount of excess air (with respect to combustion requirements) through these engines. This is a distinct drawback in Gas Turbine driven motor vehicles in that the impurities that must be ingested by the engine is essentially in direct proportion to the volume of intake air. Furthermore, the volume and temperature of the exhaust products has proven to be objectionable, particularly in slow moving and idling traffic.

(h) In the case of aircraft, the large volume of air flow requires a large inlet area which results in high drag.

OBJECTS AND ADVANTAGES (a) The A.R.E.G. is a mechanically simple engine-generator with one moving part(shuttle) and no mechanical friction.

(b) The A.R.E.G. needs no lubrication. Hence, no lubricating oil is burned or degraded. Airborne pollutants will be limited to that which results from the burning of the fuel.

(c) The absence of rubbing parts implies that the use of materials which are not suitable for rubbing parts, but which are noncorrosive, would permit the use of the alcohols which are low in polluting emissions.

(d) Fabrication tolerances can be relatively crude, again because there are no rubbing parts, and also because the A.R.E.G. will be relatively insensitive to aerodynamic considerations, as compared for example to compressors and turbines. On the other hand certain components would require relatively fine finishes in order to minimize viscous losses in high speed flow areas.

(e) In the case of the A.R.J.E., an advantage over the conventional Jet Engine is that conventional Jet Engines operate at relatively low compression ratios, simply because it is difficult to achieve relatively high compression ratios through mechanical means. On the other hand, the compression ratio of the working medium of the A.R.J.E. is a result of acoustic resonances, and the flow energy generated as a direct result of the combustion process.

DRAWING FIGURES

In the drawings, closely related Figures have the same number but different alphabetic suffixes.

FIGS. 1A to 1C reveal three engineering views of the A.R.E.G., wherein FIG. 1A is a cutaway showing the principle components and generalized shapes, while FIG. 1D is a partial view. FIGS. 1E and 1F are partial sections.

FIG. 2A is an enlarged view of 1A. FIG. 2B is an enlarged partial view of FIG. 2A. FIG. 2C is an alternate partial view of FIG. 2A. FIG. 2D is an enlarged view of FIG. 1E with detailed feature callouts. FIG. 2E is an enlarged view of FIG. 1F with detailed feature callouts.

Figure 5:
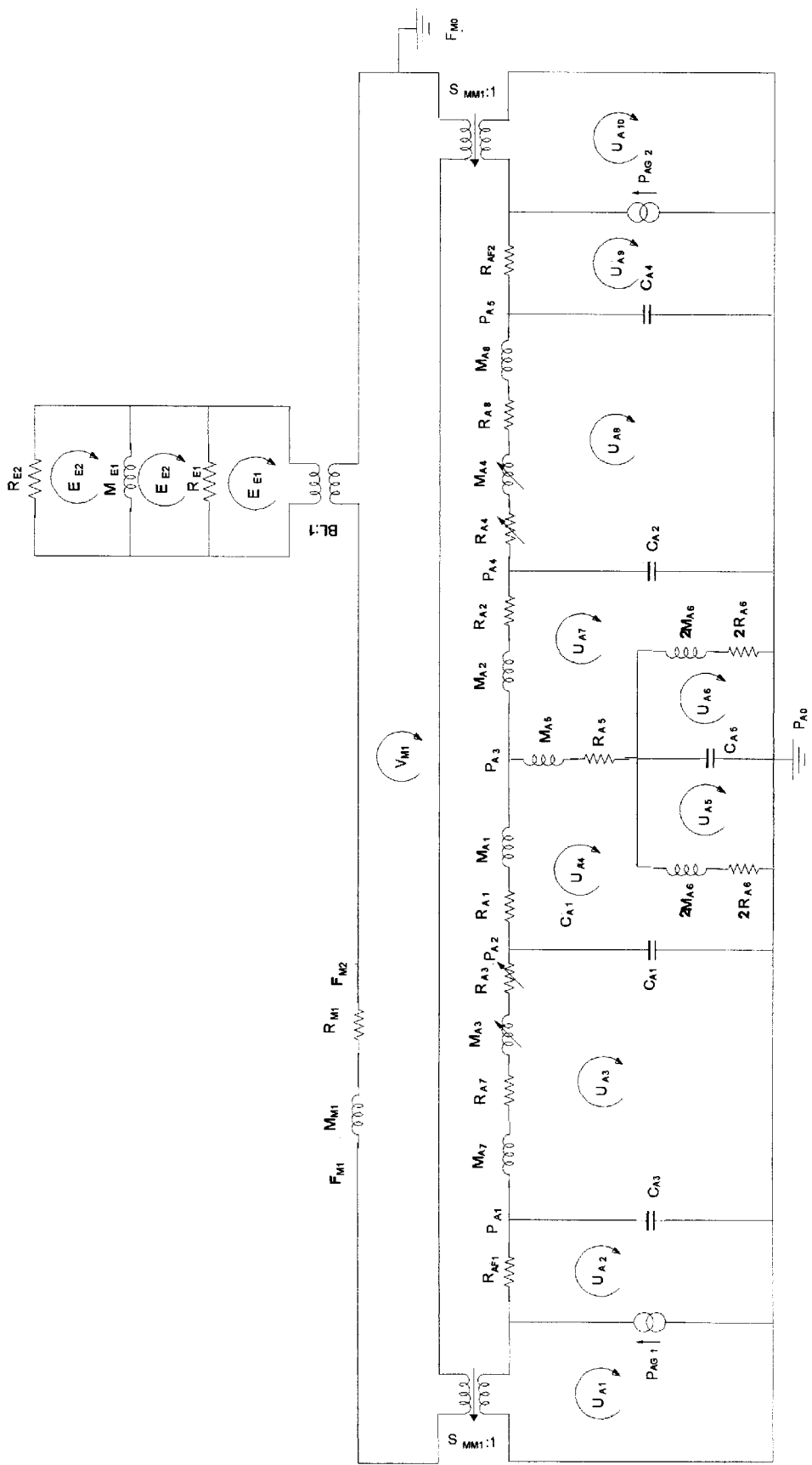
FIG. 5 is an impedance mode electrical analogue of the A.R.E.G. in which the acoustic, the mechanical, and the electrical components are coupled by ideal transformers, i.e. transformers which manifest no impedance, no capacitance, and no resistance.
Figure 6:
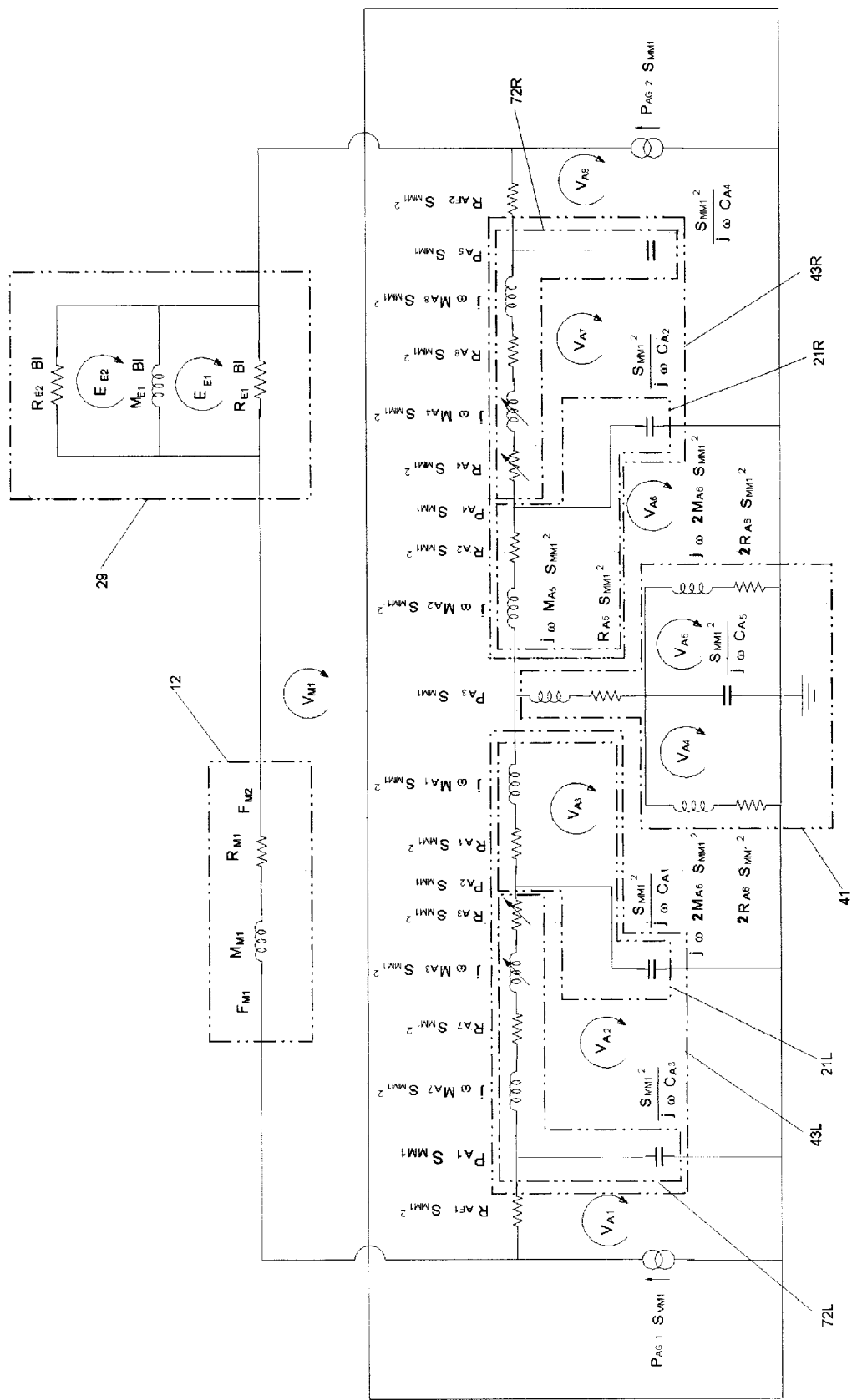

FIG. 6 is the electrical analogue of FIG. 5 with the following enhancements; first, the idealized coupling transformers have been removed—and the values of the idealized A.R.E.G. components have been appropriately modified. Second, various of the numbered formations, clusters, assemblies, and composites, are shown in phantom line enclosures which are numbered so as to correspond to the numbers under the heading "Reference Numerals In Drawings".

Reference Numerals In Drawings

| | |
|---|---|
| 10 | closure assembly |
| 11 | closure |
| 12 | shuttle assembly |
| 13 | shuttle body |
| 14L | left combustion process acoustic capacitance |
| 14R | right combustion process acoustic capacitance |
| 15L | left fixed geometry power inertance |
| 15R | right fixed geometry power inertance |
| 16L | left variable geometry power inertance |
| 16R | right variable geometry power inertance |
| 18L | left variable geometry power inertance fixed boundary |
| 18R | right variable geometry power inertance fixed boundary |
| 19 | periphery |
| 20L | left variable geometry power inertance articulated boundary |
| 20R | right variable geometry power inertance articulated boundary |
| 21L | left primary acoustic cluster |
| 21R | right primary acoustic cluster |
| 22L | left primary inertance |
| 22R | right primary inertance |
| 22aL | left primary nonconvergent inertance |
| 22aR | right primary nonconvergent inertance |
| 22bL | left primary convergent inertance |
| 22bR | right primary convergent inertance |
| 23a | intersection |
| 23b | intersection |
| 23cL | intersection |
| 23cR | intersection |
| 24 | intake/exhaust primary inertance |
| 25 | intake/exhaust capacitance |
| 26L | left sealing bellows assembly |
| 26R | right sealing bellows assembly |
| 28L | left suspension diaphragm assembly |
| 28R | right suspension diaphragm assembly |
| 29 | linear motor/generator composite |
| 30 | linear motor/generator armature assembly |
| 32 | linear motor/generator stator assembly |
| 33 | linear motor/generator stator body |
| 34 | linear motor/generator stator windings |
| 35 | fuel injector |
| 37 | magnetic lines of force |
| 38 | magnetic armature rings |
| 39L | left transition capacitance |
| 39R | right transition capacitance |

-continued

Reference Numerals In Drawings

| | |
|---|---|
| 40L | left primary acoustic cluster capacitance |
| 40R | right primary acoustic cluster capacitance |
| 41 | intake/exhaust acoustic cluster |
| 42L | left scroll acoustic capacitance |
| 42R | right scroll acoustic capacitance |
| 43L | left acoustic formation |
| 43R | right acoustic formation |
| 45a | intake/exhaust terminal inertance entrance |
| 45b | intake/exhaust inlet duct/diffuser entrance |
| 46 | intake/exhaust supersonic acoustic cluster |
| 48 | intake/exhaust secondary inertance |
| 49 | transonic secondary inertance |
| 50 | intake/exhaust terminal inertance |
| 52 | intake/exhaust array inertances |
| 54 | intake/exhaust throttled inlet duct/diffuser |
| 55 | intake/exhaust subsonic/supersonic variable inlet duct/diffuser |
| 56 | intake/exhaust subsonic-inlet/supersonic-exhaust nozzle |
| 61 | intake/exhaust subsonic/supersonic variable inlet flap |
| 62 | faired edges |
| 64aL | left sealing bellows closure fixity |
| 64aR | right sealing bellows closure fixity |
| 64bL | left suspension diaphragm closure fixity |
| 64bR | right suspension diaphragm closure fixity |
| 64c | stator assembly closure fixity |
| 66L | left sealing bellows articulated terminus |
| 66R | right sealing bellows articulated terminus |
| 68L | left suspension diaphragm fixed (nonarticulated) terminus |
| 68R | right suspension diaphragm fixed (nonarticulated) terminus |
| 70L | left suspension diaphragm articulated terminus |
| 70R | right suspension diaphragm articulated terminus |
| 72L | left power acoustic cluster |
| 72R | right power acoustic cluster |
| 74 | throttle plate |
| 76aL | left shuttle body fixity |
| 76aR | right shuttle body fixity |
| 76bL | left shuttle body fixity |
| 76bR | right shuttle body fixity |
| 80L | left sealing bellows fixed (nonarticulated) terminus |
| 80R | right sealing bellows fixed (nonarticulated) terminus |

SUMMARY

The A.R.E.G. is a "short stroke-high force" linear engine/generator which converts the heat of combustion to electrical energy, charging a battery either by electronically switching the polarity of the windings of the linear generator stator assembly as it changes direction, or else changing the natural AC output of the oscillating linear generator to DC output through the intervention of an electronic converter. The battery, on demand drives electrically motorized wheels, either of the DC variety, or through the intervention of an electronic inverter, the AC variety. The A.R.E.G. will electronically switch on and off in response to the level of the battery charge. Because the battery does not store the energy required for the "range" of the vehicle the battery can be sized in accordance with other, less demanding requirements.

In addition to its application to automotive drives the applicant submits that the A.R.E.G. would be uniquely suitable as an in situ electrical generator for buildings of all purposes. The mechanical simplicity, and consequently the long term reliability of the A.R.E.G. make it especially suitable for home use, wherein most homes are supplied with natural gas which would be a perfectly suitable fuel for the A.R.E.G. The applicant submits that electrical power networks, with their plants, distribution stations, high tension lines, and local distribution lines, could, in principle, all be eliminated. The economic and the environmental benefits are obvious.

In contrast to the ICE and the JET ENGINE, the A.R.E.G. and the A.R.J.E. are best characterized thermodynamically as utilizing "nonsteady state processes". This latter observation can result in confusion when considering the A.R.E.G. and the A.R.J.E. as a vibrating system. This is so because it is standard practice in forced vibrating systems to refer to the state in which transients have fully attenuated, "as the steady state condition".

The A.R.E.G. supports the option of running at the unique frequency and power level (except during start and stop transients) which results in optimal performance with respect to efficiency and environmental considerations. On the other hand the A.R.E.G., and in particular the A.R.J.E., can be throttled by varying the quantity of fuel injected per cycle, which will increase the stroke (amplitude) of the single moving part resulting in higher output while essentially maintaining the unique design frequency.

The A.R.J.E. differs from the A.R.E.G. as follows:

(a) Whereas in the A.R.E.G. the bulk of the energy of combustion is delivered to the linear motor-generator, no dissipative electrical energy is required by the shuttle assembly of the A.R.J.E. during steady state operation, save that which would be required if a "small" electrical generator were to be included in the shuttle assembly in order to supply auxiliary power to other systems found in typical aircraft applications. On the other hand, the linear motor-generator would be required as a motor in order to start the A.R.J.E.

(b) Given (a) above, the power components and the primary acoustic clusters, as well as the shuttle assembly, shall be configured so as to deliver most of the dissipative power to the intake/exhaust supersonic acoustic cluster.

(c) The intake/exhaust supersonic acoustic cluster shall be designed so as to manage the bulk of the energy of combustion by converting said energy into a high velocity exhaust jet, albeit an intermittent or pulsing exhaust jet, each pulse alternating with an intermittent or pulsing intake phase.

PHYSICAL DESCRIPTION—FIGS. 1 TO 3

In the following descriptions, the applicant stresses that the use of the generic terms capacitance and inertance follows the impedance mode conventions as practiced in electrical engineering, and as adapted by practitioners of mechanical and acoustic engineering via analogue techniques. The applicant pursues this course in an effort to facilitate the description of the operation of the A.R.E.G. and the A.R.J.E. as well as in the possible interest of implementing the techniques of circuit analysis in establishing at least, a set of crude, preliminary, design parameters of an operating A.R.E.G. and the A.R.J.E. To this end, FIG. 4, which is a mechanical schematic, and FIGS. 5 and 6, which are electrical schematic analogues are included and will be elaborated upon later under the heading of Mechanical Schematic Description, and Analogue Schematic Description.

A typical embodiment of the A.R.E.G. is illustrated in FIGS. 1 and 2.

A closure assembly 10 is comprised of a closure body 11, a linear motor/generator stator assembly 32—which in turn consists of a linear motor/generator stator body 33 and linear motor/generator stator windings 34, and fuel injectors 35. Closure assembly 10 also includes the left and right sealing bellows closure fixities 64aL and 64aR, and the left and right suspension diaphragm closure fixities 64bL and 64bR.

Closure body 11 comprises the fixed boundaries of and provides the geometry for a number of acoustic capacitances and inertances (and their inherent resistances). As can be seen in FIGS. 1 and 2. These acoustic elements can be formally factored into two sets. One set consists of a subset of acoustic elements, the left acoustic formation 43L, located to the left of the midplane, and a subset of acoustic elements, the right acoustic formation 43R located to the right of the midplane. These formations are mirror images of each other. In turn, left acoustic formation 43L can be factored into two subsets of acoustic elements, left power acoustic cluster 72L, and left primary acoustic cluster 21L. Similarly, Right acoustic formation 43R can be factored into two subsets of acoustic elements, right power acoustic cluster 72R, and right primary acoustic cluster 21R. The second set of acoustic elements form a set of acoustic elements which are called the intake/exhaust acoustic cluster. All of these acoustic elements will be described in detail subsequently. Closure body 11 provides a left sealing bellows closure fixity 64aL and a right sealing bellows closure fixity 64aR for a left and right sealing bellows fixed (nonarticulated) terminus 80L and 80R respectively, of a left and right sealing bellows assembly 26L and 26R respectively, as well as a left and right suspension diaphragm closure fixity 64bL and 64bR for a left and right suspension diaphragm fixed (nonarticulated) terminus 68L and 68R respectively, of a left and right suspension diaphragm assembly 28L and 28R respectively, as well as a stator assembly closure fixity 64c for a linear motor/generator stator assembly 32.

Specifically, left and right power acoustic clusters 72L and 72R consist of a left and right combustion process acoustic capacitance 14L and 14R respectively, a left and right fixed geometry power inertance 15L and 15R respectively, and a left and right variable geometry power inertance fixed boundary 18L and 18R respectively of a left and right variable geometry power inertance 16L and 16R respectively. Furthermore, left and right primary acoustic clusters 21L and 21R consist of a left and right primary acoustic capacitance 40L and 40R respectively, and a left and right primary inertance 22L and 22R respectively. In turn, left and right primary acoustic capacitances 40L and 40R consist of a left and right scroll acoustic capacitance 42L and 42R respectively, and a left and right transition capacitance 39L and 39R respectively. Also, left and right primary inertances 22L and 22R consist of a left and right primary nonconvergent inertance 22aL and 22aR respectively, in series with a left and right primary convergent inertance 22bL and 22bR respectively. In detail, the cross sectional "flow area" (the quotes allows that an ideal capacitance has no flow area) of scroll acoustic capacitances 42L and 42R increases bilaterally with respect to semicircumferential location, and communicates with a left and right transition capacitance 39L and 39R respectively. In turn, left and right transition capacitances 39L and 39R communicate with left and right primary inertance 22L and 22R respectively. Left and right primary inertances 22L and 22R communicate on their outboard sides with left and right transition capacitance 39L and 39R respectively and with each other on their inboard sides. The lesser dimension of left and right primary convergent inertances 22bL and 22bR, through the intervention of faired edge(s) 62, circumferentially communicate with a disk shaped intake/exhaust primary inertance 24, which in turn circumferentially communicates with an intake/exhaust capacitance 25. The cross sectional "flow area" (the quotes allows that an ideal capacitance has no flow area) of intake/exhaust capacitance 25 increases linearly with respect to semi-circumferential location, and communicates with intake/exhaust secondary inertance 48, which communicates with both intake/exhaust terminal inertance 50 and an array of "small" intake/exhaust array inertances 52. The former of the two inertances will communicate directly with the atmosphere, or if deemed necessary, will communicate with a sound reducing system and/or filtering system which communicates with atmosphere.

The detail structural design of closure body 11, as well as the other components, is not critical to the principles of operation of the subject of this patent application. No particular detail structural designs will be depicted in the Figures, nor alluded to hereafter.

A shuttle assembly 12 consists of a shuttle body 13, and a linear motor/generator armature assembly 30 consisting of two or more (four shown) magnetic armature rings 38 affixed to shuttle body 13. In addition, shuttle body 13 provides a left and right shuttle body fixity 76aL and 76aR for left and right sealing bellows articulated terminus 66L and 66R respectively, of left and right sealing bellows assembly 26L and 26R respectively, as well as left and right shuttle body fixity 76bL and 76bR for left and right suspension diaphragm articulated terminus 70L and 70R respectively, of left and right suspension diaphragm assembly 28L and 28R respectively.

Figure 2A:
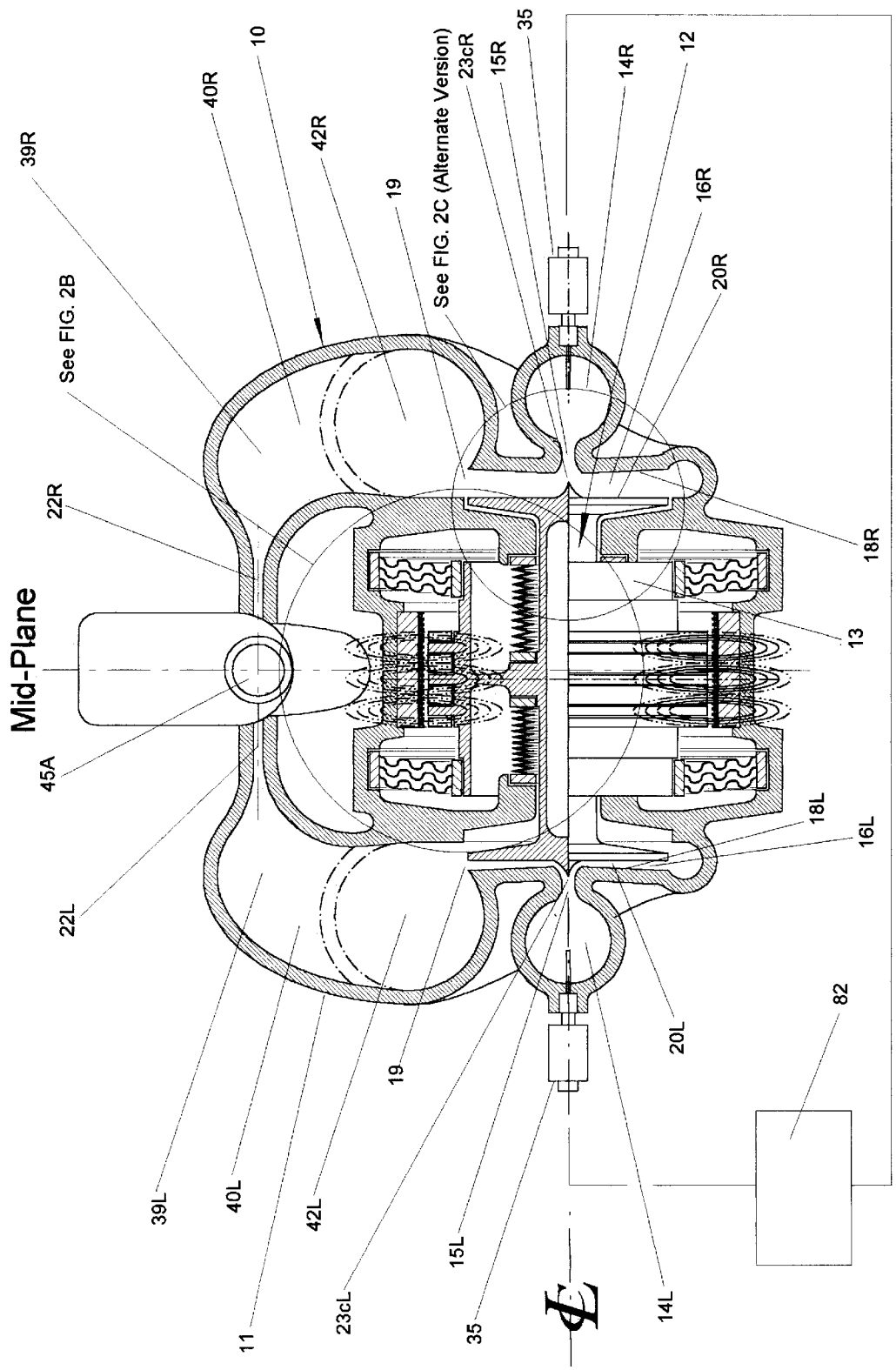

Shuttle body 13 is axisymmetric about the center line indicated in FIG. 2A, and is laterally symmetric with respect to the mid-plane of the A.R.E.G., also indicated in FIG. 2A, when in its neutral or static position. Shuttle body 13 provides a left and right variable geometry power inertance articulated boundary 20L and 20R for left and right variable geometry power inertance 16L and 16R respectively.

The conjunction of left and right variable geometry power inertance fixed boundary 18L and 18R, and left and right variable geometry power inertance articulated boundary 20L and 20R respectively, which comprise left and right variable geometry power inertances 16L and 16R respectively, may be either unilaterally or bilaterally linearly or nonlinearly radially-divergent or radially-convergent, or radially parallel, as determined by the disciplines of fluid mechanics.

The idealized and contiguous acoustic capacitances and inertances described above collectively comprise the total volume of the working medium, said volume being completely bounded by those internal surfaces of closure 11, and those external surfaces of shuttle body 13 contiguous with the internal surfaces of left and right sealing bellows 26L and 26R. Said volume communicates with the atmosphere, only by virtue of the intervention of intake/exhaust acoustic cluster 41.

Figure 2B:
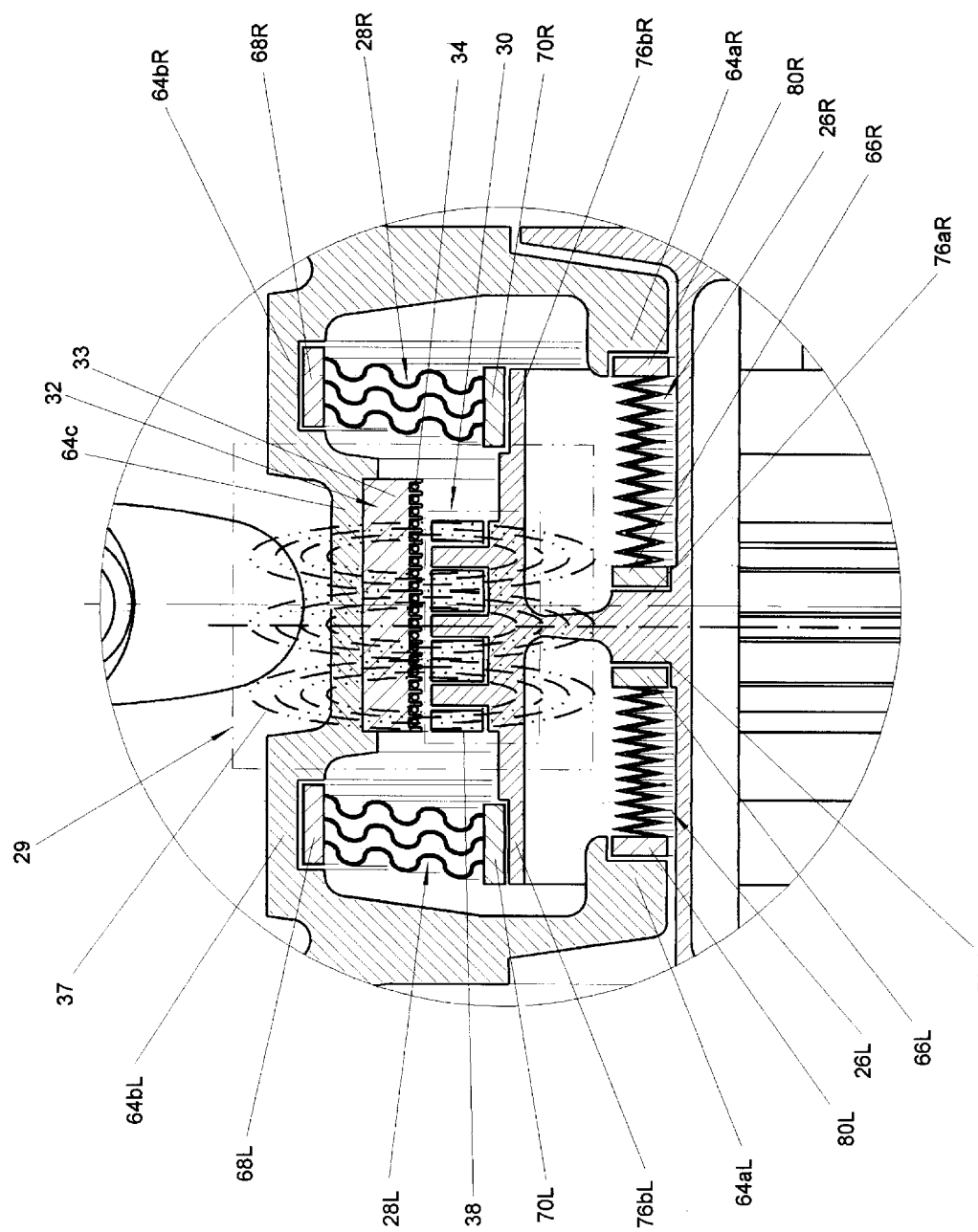
Figure 2C:
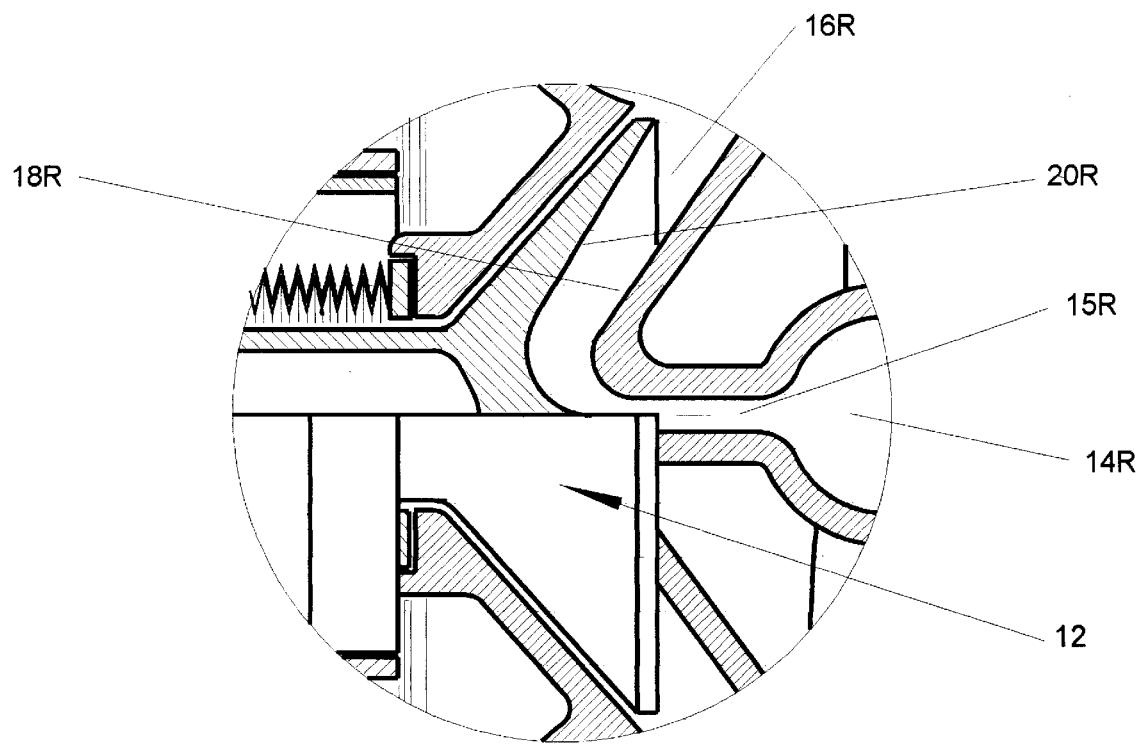
Figure 2E:
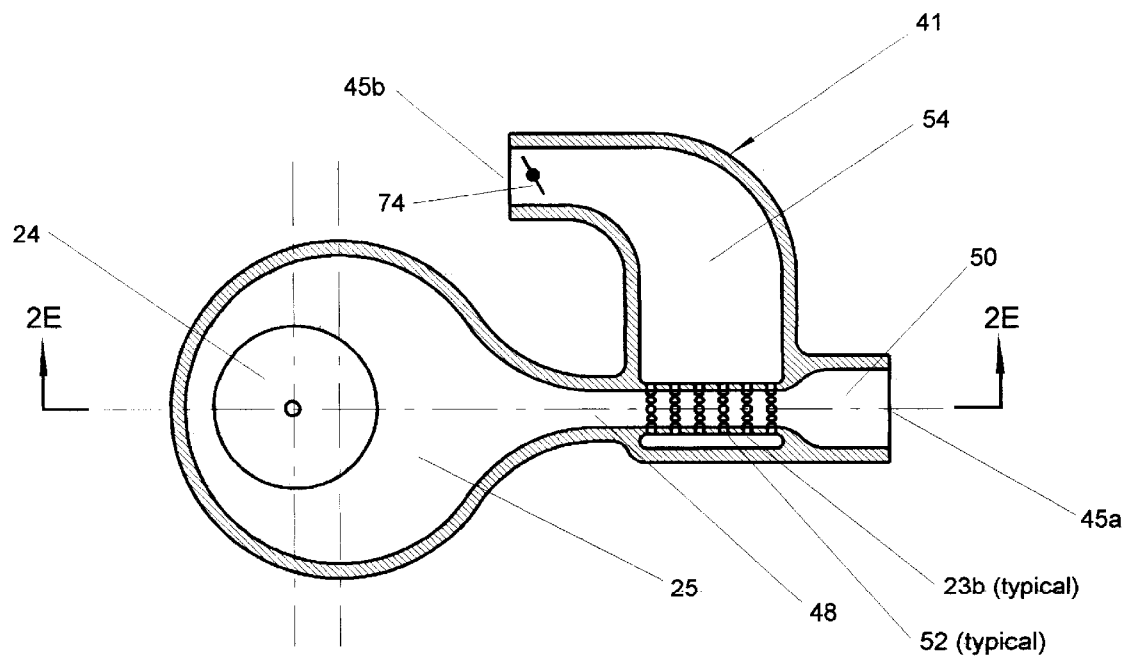
Figure 2D:
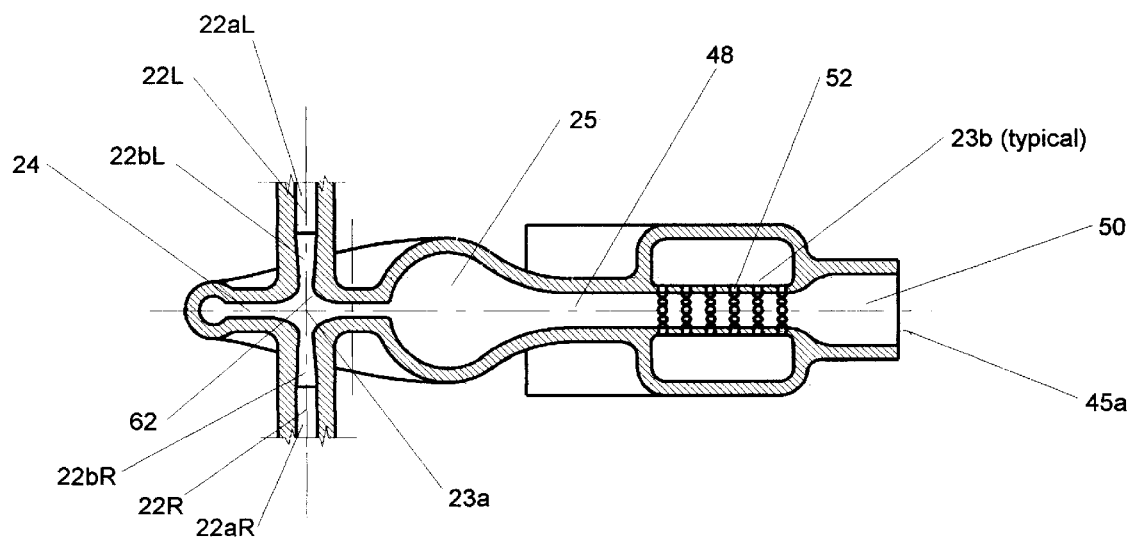

FIG. 2A and FIG. 2B reveals that shuttle assembly 12 (shown in its extreme left operating position) is circumferentially suspended from closure assembly 10 by the intervention of left and right suspension diaphragm assembly 28L and 28R in such manner as to maintain the required concentricity between the corresponding surfaces which comprise left and right variable geometry power inertance 16L and 16R, as well as the required concentricity between linear motor/generator armature assembly 30 and linear motor/generator stator assembly 32.

Figure 3:
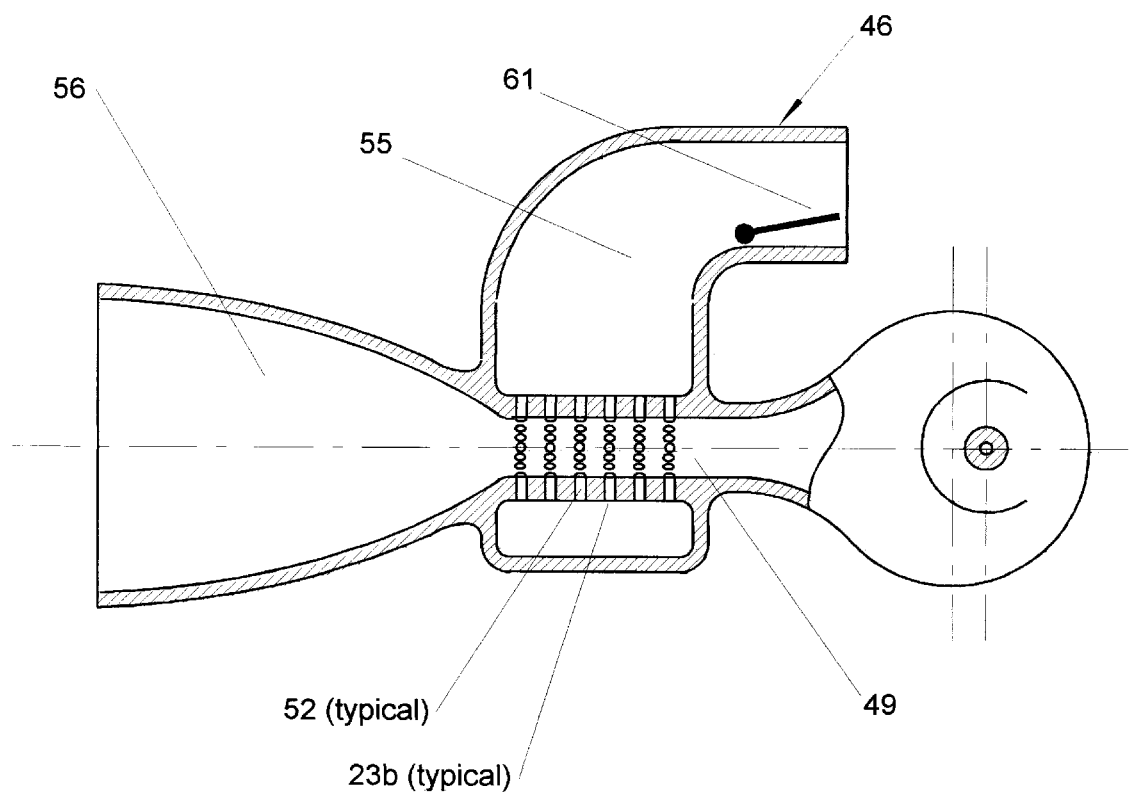
FIG. 3 shows the intake/exhaust supersonic acoustic cluster as configured in the embodiment of the subject invention as an acoustically resonant aircraft jet engine (A.R.J.E.).

FIG. 3 illustrates a variation of the intake/exhaust acoustic cluster 41 as required for the embodiment of the acoustically resonant aircraft jet engine (A.R.J.E.) version of the A.R.E.G. To wit, intake/exhaust acoustic cluster 41 is replaced by intake/exhaust supersonic acoustic cluster 46, in which intake/exhaust terminal inertance 50 is replaced by intake/exhaust subsonic-inlet/supersonic-exhaust nozzle 56. Intake/exhaust throttled inlet/duct diffuser 54 is replaced by intake/exhaust subsonic/supersonic variable inlet/duct diffuser 55 in conjunction with intake/exhaust subsonic/supersonic variable inlet flap 61. And intake/exhaust secondary inertance 48 is replaced by intake/exhaust transonic secondary inertance 49. Said elements to be in accordance with the state of the art of subsonic/supersonic aircraft jet engine design.

MECHANICAL SCHEMATIC DESCRIPTION—FIG. 4

ANALOGUE SCHEMATIC DESCRIPTION—FIGS. 5 & 6

Figure 4:
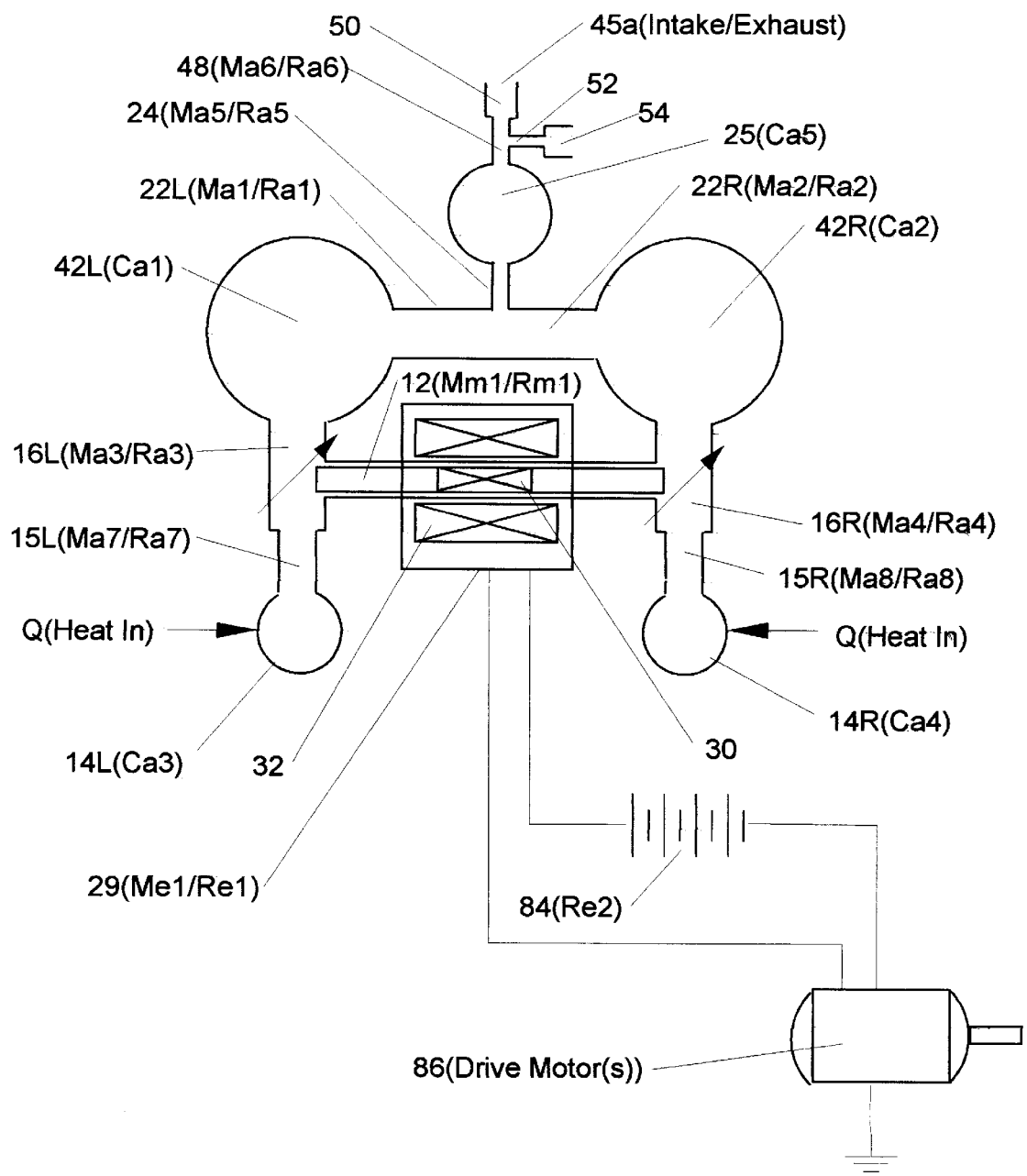
FIG. 4 is a mechanical schematic of the A.R.E.G.

Referring to the idealized and simplified mechanical schematic FIG. 4, and the idealized and simplified analogue schematics FIGS. 5 and 6, it is noted that the A.R.E.G. and the A.R.J.E., as idealized, are modeled as forced vibrating systems of multiple degrees of freedom of acoustic, mechanical, and/or electrical elements. An acoustic degree of freedom refers to an "acoustic mass", or inertance. A mechanical degree of freedom is conventionally referred to simply as a mass. An electrical degree of freedom is conventionally referred to as an inductance.

In mechanical schematic FIG. 4 these "mass" elements are denoted as $M_{AN}$ where M refers to an acoustic mass (inertance), a mechanical mass, or an electrical mass (inductance), as indicated by the subscripts A, M, or E respectively, and individually denoted by an integer N.

Acoustic capacitances are referred to as acoustic capacitances. Mechanical capacitances (springs) are not depicted as a result of schematic simplifications of the actual invention. Electrical capacitances would be referred to as electrical capacitances, however electrical capacitances are not fundamental to the subject invention. In mechanical schematic FIG. 4 the capacitive elements are denoted as $C_{AN}$, where C refers to an acoustic capacitance, a mechanical capacitance, or an electrical capacitance, as indicated by the subscripts A, M, or E respectively, and individually denoted by an integer N.

Acoustic, mechanical, and electrical resistances are referred to as just that. Because the A.R.E.G. and the A.R.J.E. have no rubbing parts, the only mechanical resistance issues from the hysterisis inherent in the sealing bellows and the suspension diaphragms. In mechanical schematic FIG. 4 these "resistive" elements are denoted as $R_{AN}$ where R refers to an acoustic resistance, a mechanical resistance (none indicated), or an electrical resistance, as indicated by the subscripts A, M, or E respectively, and individually denoted by an integer N.

Loop values are denoted as $U_{AN}$, $V_{AN}$, $V_{MN}$, and $E_{EN}$, wherein U refers to volume velocity, V refers to linear velocity, and E refers to electric potential. The subscripts A, M, and E refer to acoustic, mechanical, and electrical, respectively. The loops are further identified by the integer N.

The addition of heat as a result of combustion is represented in FIGS. 5 and 6 by constant force generators denoted as $P_{AGN}$, where P refers to the pressure, AG refers to acoustic generator, and the integer N denotes the specific source of heat input. The applicant reminds the reader that the term "constant force generator," when used in the context of electrical analogues only means that the output of the generator is not affected by the passive elements of the circuitry, as opposed to meaning that the force per se is numerically constant. Of course the assertion that the output is in fact not affected by the passive elements is in itself an idealization. Furthermore, it is noted that the pressure trace issuing from the constant force generator, and representative of combustion, is a rectified pressure trace because there is no such thing as an absolute negative pressure.

In the FIGS. 5 and 6 schematics the "masses", "capacitances", and "resistances" are shown as lumped elements as is customary in analogue representations. FIGS. 5 and 6 also includes "ideal transformers" which are termed ideal in the sense that they exhibit no inductance, no capacitance, and no resistance. These transformers serve to make the acoustic, the mechanical, and the electrical portions of the total network mathematically consistent. By way of detail the applicant notes that the two inertances denoted as $2M_{A6}$ and the two resistances denoted as $2R_{A6}$ actually represent and are equivalent to a single physical inertance of value $M_{A6}$ and a single physical resistance of value $R_{A6}$. This artifice is required because the techniques of electrical analogizing require that acoustic capacitances, such as that denoted as $C_{A5}$, have one terminal at ground potential.

In the FIG. 6 schematic the quantification of the lumped elements is modified as is appropriate so as to compensate for the removal of the transformers. In addition, the enumerated phantom line boxes group various of the lumped elements into formations and clusters in the case of acoustic elements, and assemblies and composites in the case of mechanical and electrical components.

The applicant acknowledges the fact that the large pressure excursions required by a heat engine, in contrast to those typical of an acoustic communications device, violate the prerequisites of "linear" circuit analysis. As in circuit analysis, said components are idealized as exhibiting only that characteristic as implied by the generic term. This is so notwithstanding the fact, for example, that inertances may exhibit a significant degree of resistance. Given this, said resistance is isolated as such and treated as a component in series with the inertance. The applicant is particularly aware of the fact that acoustic components are not as well suited to idealization as are electrical components. Additionally it is noted that the analogue techniques herein alluded to do not take account of the pressure and density changes in fluids resulting from the fluid velocity changes in passing from acoustic capacitances to inertances and vice versa. These effects need to be superimposed on the fluid states as determined by the conventional analogue circuit analyses. Also, the applicant notes that only the most operationally significant elements are included in the schematics. Specifically, the sealing bellows and the suspension diaphragms, which when idealized, would be represented as mechanical capacitances (springs), as well as resistances (due to hysterisis), are not represented in the schematics. Also an array of intake/exhaust acoustic inertances are not identified independently but rather combined with the intake/exhaust secondary inertance in the schematics. So too, the applicant does not represent the intake/exhaust throttled inlet duct/diffuser which, depending on its size and shape, may qualify only as a channel—or as an inertance—or as a capacitance. The fact is that if the A.R.E.G. or the A.R.J.E. were in motion such that the intake/exhaust throttled inlet duct/diffuser were to experience ram air, the intake/exhaust throttled inlet duct/diffuser might best be viewed as a passive energy input source wherein the relative kinetic energy of the air would be converted into pressure energy via the diffusion process.

GLOBAL OPERATION—FIGS. 1 to 6

The operation of the A. R.E.G. and the A.R.J.E. can be viewed as a vibratory system of a finite number of degrees of freedom in which the periodic input of energy equals the "useful output" of the A.R.E.G. or the A.R.J.E. plus the unrecoverable energy losses which are inherent in various forms in heat engines. In the case of the A.R.G.E. the "useful output" is in the form of electrical energy, which maintains the energy level of the drive battery and/or directly drives electric wheel motors, or alternatively, drives a central motor which drives the wheels. On the other hand the "useful output" of the A.R.J.E. will be primarily in the form of the kinetic energy of the exhaust jet.

At the risk of stating the obvious, the applicant points out that when the A.R.E.G. or the A.R.J.E. is not in operation, i.e. neither during the transient states of starting nor during the subsequent conditions of steady state operation, the thermodynamic states existing within the acoustic components are without exception, unremarkable, i.e. there are neither pressure nor temperature nor density gradients within, nor across the admittedly nebulous boundaries which "distinguish" one acoustic component from another. However, during both of these operational modes, i.e. during both transient operation and steady state operation, there will be two thermodynamic mechanisms at work from a modeling or analytical point of view. Specifically, the modeling of the system as an analogue of an alternating current electrical system does not account for the changes in thermodynamic states which issue from velocity changes, in accordance with Bernoulli's principal, wherein the potential energy of pressure is converted to the kinetic energy of velocity and vice versa. FIGS. 5 and 6 as rendered do not account for these potential to kinetic and vice versa energy conversions. The applicant has not chosen to do so, but the conversion theoretically could be accounted for by incorporating additional ideal transformers into FIG. 5.

These mechanisms will superimpose, each precipitating thermodynamic gradients, such as to produce the confluence of thermodynamic gradients which are necessary within any heat engine which purpose is to convert the latent energy of exothermic substances into the relatively unstable states of potential and kinetic energy.

STATIC OPERATION—FIG. 2A

The static operation of the A.R.E.G. and the A.R.J.E. alludes to the articulation of mechanical components. Shuttle assembly 12 is a rigid body assembly which oscillates along the center line of the A.R.E.G. and the A.R.J.E. at their respective design frequencies. Left and right sealing bellows assemblies 26L and 26R, and left and right suspension diaphragm assemblies 28L and 28R are structures which include nonrigid components which deform as required in order to accommodate the relative motion between shuttle assembly 12 and closure assembly 10, while performing other specific functions. To wit, aside from the fact that intake/exhaust acoustic cluster 41 communicates with atmosphere via intake/exhaust terminal inertance 45a and intake/exhaust throttled inlet duct/diffuser entrance 45b, left and right sealing bellows assemblies 26L and 26R provide a "hard" seal which partitions the working medium resident within the A.R.E.G. and the A.R.J.E. from otherwise communicating with atmosphere, preventing an interchange of fluids and hence pressure states—except to the extent that the local processes are not ideally adiabatic. Left and right suspension diaphragm assemblies 28L and 28R serve to maintain the required degree of centering of shuttle assembly 12 about the centerline of the A.R.E.G. and the A.R.J.E., and also serves to maintain the magnetic gap, to the degree required, between linear motor/generator armature assembly 30, and linear motor/generator stator assembly 32.

Although both left and right sealing bellows assemblies 26L and 26R, and left and right suspension diaphragm assemblies 28L and 28R, will, because of their elasticity, contribute to the limiting of the amplitude of shuttle assembly 12 to its design amplitude, the applicant submits that left and right suspension diaphragm assemblies 28L and 28R will be especially effective in that role because of the inherent nonlinearity of deformable diaphragms. As shuttle assembly 12 articulates with respect to closure assembly 10—so does linear motor/generator armature assembly 30 articulate with respect to linear motor/generator stator assembly 32.

TRANSIENT OPERATION—FIG. 2A

In order to start the A.R.E.G. or the A.R.J.E., the on board storage battery (not shown) inputs its DC output directly to the integral linear motor/generator composite 29, which then functions as a motor. To wit, the polarity of the windings of linear motor/generator stator windings 34 is switched in response to position specific feedback from shuttle assembly 12. Alternatively, the on board battery inputs its DC output to an electronic inverter (not shown) whose AC output drives the integral linear motor/generator composite 29, as a motor. In either case, this causes shuttle assembly 12, which includes linear motor/generator armature assembly 30, to oscillate at some starting mode design frequency over its starting mode design amplitude.

Because shuttle assembly 12 manifests a differential area with respect to left acoustic formation 43L and right acoustic formation 43R, the appropriate selection of the frequency of oscillation of shuttle assembly 12 will induce resonance in the resident working medium, which, prior to any combustion, will consist exclusively of ambient air. Specifically, the differential area is characterized by a diameter whose termini lie somewhere between the inner and outer diameters of left and right sealing bellows assemblies 26L and 26R. When shuttle assembly 12 strokes to the left the working medium (ambient air) resident in left acoustic formation 43L, will, by virtue of the differential area, be displaced so as to flow from left acoustic formation 43L to right acoustic formation 43R via left primary inertance 22L and right primary inertance 22R. The ambient air will be somewhat compressed by virtue of the acoustic impedances presented by the acoustic inertances in general, but will be notably compressed by virtue of the acoustic impedance presented by left and right primary inertances 22L and 22R. Simultaneously, the alternating flow of the working medium through left and right primary inertances 22L and 22R, will, because of the venturi effect, manifest an alternating static pressure variation which will range both higher and lower than the ambient pressure. Said variation will in turn induce ambient air to be entrained, at intersection 23a, by the working medium either flowing from left primary inertance 22L to right primary inertance 22R, or flowing from right primary inertance 22R to left primary inertance 22L. Said flow then enters right acoustic formation 43R or left acoustic formation 43L respectively. When the static pressure in either left or right combustion process acoustic capacitance 14L or 14R reaches a level which is sufficient to initiate combustion, a pressure transducer monitoring the static pressure in either left or right acoustic capacitance 14L or 14R, signals a computer module to switch the operating mode of linear motor/generator composite 29 from that of a motor to that of a generator. Fuel injector 35 will then inject a quantity of fuel into left or right combustion process acoustic capacitance 14L or 14R, as appropriate. Combustion may be initiated as a result of either compression ignition or spark ignition, depending on the detail design of the A.R.E.G. or the A.R.J.E. The applicant submits that compression ignition would be preferable, and in anticipation of this the Figures are shown without spark plugs. Following the first event of fuel injection and ignition the A.R.E.G. and the A.R.J.E. will cycle through transients for some period of time after which they will enter into the steady state operational mode.

STEADY STATE OPERATION—FIGS. 1 to 6

In the design depicted as well as in the descriptions of the several operational modes it is assumed that all components are designed such that all components operate within the subsonic regime. The applicant, however anticipates the feasibility of a detail design in which supersonic flows are achieved during various phases of operation. This is more notably an option in the case of the A.R.J.E. Indeed in the embodiment of the A.R.J.E. the applicant has previously specified intake/exhaust subsonic/supersonic variable inlet duct/diffuser 55 and intake/exhaust subsonic-inlet/supersonic-exhaust nozzle 56.

The varying mixtures of ambient air, fuel, and the products of combustion throughout the A.R.E.G. and the A.R.J.E., including purely ambient air, during any phase of operation, will be generally referred to as the "working medium."

During steady state operation, as noted previously, indeed during transient operation as well, there are two thermodynamic mechanisms at work. First, there are the thermodynamic processes which are analogous to the electrical processes as modeled in electrical schematics and as quantified through the techniques of network analysis. Such an analysis could be used as a preliminary analysis in establishing the level of resonance desired at the various pressure nodes, and the required volume flow rates—albeit the applicant reiterates recognition of the nonlinearity of an actual system. Second, there are the thermodynamic processes which correspond to the provisions of Bernoulli's principle which would be superimposed onto a network analysis.

During steady state operation—and in accordance with the network effects of schematic FIGS. 5 and 6—the working medium will be oscillating at some design frequency between left acoustic formation 43L and right acoustic formation 43R via the included left and right primary inertances 22L and 22R. In accordance with the effects of Bernoulli's principle; as the working medium alternately accelerates and decelerates during its flowing in either direction through these acoustic elements, the static pressure of the working medium within these acoustic elements will decrease and increase about some mean reference design pressure. By way of detail, note that when the working medium issues from either left or right primary inertance 22L or 22R, on its way from one to the other, a radial component of flow is imparted to the working medium by virtue of the convergent form of left or right primary convergent inertance 22bL or 22bR. The result of this radial component of flow is the focusing of the flow of the working medium as it bridges the gap, defined as intersection 23a, between left and right primary inertances 22L and 22R.

It is assumed that at some time T=0 the oscillation of the working medium is such that the pressure, density, and temperature of the working medium resident in left acoustic formation 43L is essentially uniform and essentially at the design pressure and temperature at which fuel is to be injected and combustion is to be initiated. Concurrently the pressure and density of the working medium resident in right acoustic formation 43R is essentially uniform and essentially at the minimum of design values for the cycle. Additionally, shuttle assembly 12 will be at its leftmost operating position and momentarily at rest. In this configuration left variable geometry power inertance 16L will manifest its maximum operational inertance as determined by the proximity of left variable geometry power inertance fixed boundary 18L of closure 11, and left variable geometry power inertance articulated boundary 20L of shuttle body 13. The static pressure, density and the temperature of the working medium in left combustion process acoustic capacitance 14L will be essentially maximized, as will these parameters in all the elements of left acoustic formation 43L. The applicant uses the word "essentially" often in these descriptions because of the possibility of phase displacements in these parameters from one acoustic element to another acoustic element. Such phase displacements may be a result of the variability of left and right variable geometry power inertance 16L and 16R as well as the normal instabilities inherent in oscillating systems, particularly in acoustic systems. The essential uniformity of the stagnation pressure throughout left acoustic formation 43L, in particular, is desireable in order that the stagnation pressure in left primary acoustic cluster capacitance 40L assist in confining the working medium to left combustion process acoustic capacitance 14L for a long enough period of time such that the combustion process is sufficiently complete. Such confinement of course, is largely provided by the acoustic impedance manifested by left fixed geometry power inertance 15L, and of course by right fixed geometry power inertance 15R when combustion takes place in right combustion process acoustic capacitance 14R. The applicant reminds the reader that energy input, i.e. combustion takes place at each half cycle during the operation of the A.R.E.G. and the A.R.J.E.

Assuming that compression ignition is utilized, the essentially maximized pressure and temperature in left combustion process acoustic capacitance 14L will by design be at least as high as is the pressure and temperature in conventional compression ignition engines. However, the applicant perceives that a much higher design pressure and temperature could be utilized, resulting in a higher efficiency than in conventional compression ignition engines. In any case the A.R.E.G or the A.R.J.E. is now configured for combustion.

Left fuel injector 35 will inject a quantity of fuel, e.g. diesel oil, gasoline, alcohol, jet fuel, or even gaseous fuels, into left combustion process acoustic capacitance 14L, wherein the elevated pressure and temperature of the working medium therein will precipitate the burning of the fuel, and thereby the addition of heat to the working medium therein. The static pressure and the temperature within left combustion process acoustic capacitance 14L will of course increase precipitously. The working medium within left combustion process acoustic capacitance 14L, having increased in static pressure, will expand and enter, and pass through left power inertance 15L. As the working medium enters left fixed geometry power inertance 15L it will accelerate, converting part of the pressure energy into the kinetic energy of velocity. As the working medium exits left power inertance 15L it encounters and follows the local contour presented by left variable geometry power inertance fixed boundary 18L of closure 11, and left variable geometry power inertance articulated boundary 20L of shuttle body 13. The working medium changes its direction so as to flow radially—360 degrees about the center line of the A.R.E.G. or the A.R.J.E.—through left variable geometry power inertance 16L. As the working medium issues from periphery 19 of left variable geometry power inertance 16L it collects in left primary acoustic cluster capacitance 40L.

In its journey through left variable geometry power inertance 16L, the working medium is subject to several thermodynamic mechanisms—the specific number of such mechanisms depending on the specific shape of left variable geometry power inertance fixed boundary 18L and variable geometry power inertance articulated boundary 20L. To wit, as the working medium flows radially through left variable geometry power inertance 16L, the flow area, which is a cylindrical surface, increases as a function of the radial distance of that cylindrical surface from the center line of the A.R.E.G. or the A.R.J.E. Concurrently the flow area of the cylindrical surface increases or decreases at some rate depending on whether left variable geometry power inertance fixed boundary 18L, and left variable geometry power inertance articulated boundary 20L, diverge or converge as a function of the radial location of the cylindrical surface with respect to the centerline of the A.R.E.G. or the A.R.J.E. On the other hand, if left variable geometry power inertance fixed boundary 18L and left variable geometry power inertance articulated boundary 20L, are parallel as opposed to either converging or diverging, then the flow area of the cylindrical surface will only vary as a function of the radial location of the cylindrical control surface and on the proximity of left variable geometry power inertance fixed boundary 18L and left variable geometry power inertance articulated boundary 20L with respect to each other. The latter being a function of the instantaneous position of shuttle assembly 12. In any case the confluence of these parameters will be such that the flow area will be increasing—with the result that the working medium flowing radially through left variable geometry power inertance 16L will decelerate—converting the kinetic energy of the working medium to static pressure.

The conversion of the kinetic energy of the working medium to static pressure will result in a positive pressure gradient of some functionality starting at the centerline of the A.R.E.G. or the A.R.J.E. and progressing radially to periphery 19 of left variable geometry power inertance 16L. The summation of the resulting static pressure profile at any instant of this portion of the cycle comprises a net force which accelerates shuttle assembly 12 to the right. The applicant will subsequently discuss the impact of the acceleration of shuttle assembly 12 on linear motor/generator composite 29.

The rationale for the acoustic arrangement of left and right power acoustic clusters 72L and 72R bears some exposition. To wit, a primary goal of the subject invention is the elimination of a need for lubrication. In order to avoid the need for lubrication, there should be no relative motion between contacting mechanical components. Since there is to be no motion between contacting mechanical components, seals which isolate and/or contain the products of combustion with respect to atmosphere, as well as the structural components which constrain and/or guide the motion of those components to which the energy of combustion is imparted, must be "flexible." Additionally, in the case of the seals, said "flexible" seals must be "hard" seals. In order to maximize the operational life of such devices, it is necessary that such devices operate well within their fatigue limits. This limitation mandates that the amplitude of moving components be minimized. However, at low amplitudes it is necessary that either or both of the frequency and the magnitude of the energy imparted per cycle, be maximized in order to realize a particular magnitude of horsepower. The frequency of an individual source of power, such as an individual ICE cylinder, is limited by the time required by a combustible charge to satisfactorily burn and release its latent energy. The order of magnitude of this limitation, as evidenced by current ICE technology, appears to be between 12 and 15 milliseconds. This translates to approximately 66 to 83 combustion events per second. However, in the case of the ICE, there is a finite and significant period required between successive combustion events of an individual ICE cylinder—as there is between successive combustion events of the A.R.E.G. and the A.R.J.E., which, however, the applicant submits would be significantly less because of the relative simplicity of the mechanical components. In the case of the ICE the solution to increasing horsepower is either to increase the number of cylinders—which results in an approximately proportional increase in complexity—or, increasing the diameter of the cylinders, and or the stroke of the pistons. Increasing the diameter of the cylinders increases the aspect ratio of the diameter of the cylinder to the clearance distance—for a given compression ratio. A higher aspect ratio represents a greater deviation from the ideal, in terms of combustion efficiency, which would be an approximately spherical shaped combustion chamber. Increasing the stroke, on the other hand, greatly increases the size and weight of the ICE, and increases the friction losses. In contrast to these objections the acoustic elements as arranged in the left and right power acoustic clusters 72L and 72R of the A.R.E.G. and the A.R.J.E. include an approximately spherical combustion chamber. Also there are no severe restrictions in selecting relatively large pressure reacting diameters for the left and right variable geometry power inertances 16L and 16R. In such case the short stroke is compensated for by the large pressure reacting diameters.

As the working medium issues from periphery 19 of left variable geometry power inertance 16L and collects in left primary acoustic cluster capacitance 40L and left transition capacitance 39L, wherein the static pressure increases. As said static pressure increases the flow of the working medium from left combustion process acoustic capacitance 14L through left variable geometry power inertance 16L diminishes and eventually stops. At this point the static pressure throughout left acoustic formation 43L is essentially uniform. However, as long as the static pressure in left acoustic formation 43L exceeds the static pressure in right acoustic formation 43R there will be a net force accelerating shuttle assembly 12 to the right because of the differential area manifested between left sealing bellows assembly 26L and closure 11.

Because of the combustion which took place in left combustion process acoustic capacitance 14L, and the subsequent increasing of the static pressure in left acoustic formation 43L over that in right acoustic formation 43R, the working medium will be induced to flow from left acoustic formation 43L to right acoustic formation 43R through left and right primary inertances 22L and 22R. Initially the acceleration and therefore the velocity of the working medium flowing through left and right primary inertances 22L and 22R will be such that the static pressure of the working medium therein will not be significantly below the static pressure prevailing in left primary acoustic cluster capacitance 40L, which will be significantly higher than ambient pressure. However, as the rising static pressure in left primary acoustic cluster capacitance 40L continues to accelerate the working medium through left and right primary inertances 22L and 22R the static pressure of the working medium therein will fall low enough such that the static pressure at intersection 23a of left and right primary inertances 22L and 22R, and intake/exhaust primary inertance 24, will, via the intervention of intake/exhaust capacitance 25, intake/exhaust secondary inertance 48, and intake/exhaust array inertances 52, induce ambient air—somewhat diluted by the residual products of combustion from the previous exhaust which remain in the vicinity of entrance 45a to intake/exhaust terminal inertance 50—to flow into intake/exhaust terminal inertance 50. Additionally, when the velocity of this flow through intake/exhaust secondary inertance 48 is such that the static pressure at intersection 23b of intake/exhaust secondary inertance 48 and intake/exhaust array inertances 52 falls below the pressure in intake/exhaust throttled inlet duct/diffuser 54, ambient air will flow from intake/exhaust throttled inlet duct/diffuser 54 through intake/exhaust array inertances 52, to be entrained by the working medium which is flowing through intake/exhaust secondary inertance 48. This induction of ambient air increases the oxygen content of the flow originating at entrance 45a of intake/exhaust terminal inertance 50. Following its encounter with intake/exhaust secondary inertance 48 this flow of the working medium, will, via the intervention of intake/exhaust capacitance 25 and intake/exhaust primary inertance 24 flow to intersection 23a of intake/exhaust primary inertance 24 and left and right primary inertance 22L and 22R where this working medium, will be entrained by the working medium flowing through left and right primary inertance 22L and 22R. This is the intake portion of the intake/exhaust processes, both of which take place within intake/exhaust acoustic cluster 41 during each half cycle. A description of the exhaust portion of the intake/exhaust processes will be addressed later in this description. The periodic diluting of the steady state working medium with ambient air—as described in the two processes above—improves the composition of the steady state working medium, which eventually reaches right combustion process acoustic capacitance 14R, such that said composition does not contain an excessive amount of the products of combustion. This ambient-air-enriched working medium will accumulate and diffuse in right primary acoustic cluster capacitance 40R, and right combustion process acoustic capacitance 14R. That portion of the ambient-air-enriched working medium collecting in right combustion process acoustic capacitance 14R will first pass through right variable geometry power inertance 16R and right power inertance 15R.

At the time of combustion in left combustion process acoustic capacitance 14L, when shuttle assembly 12 is in its leftmost position, right variable geometry power inertance 16R will manifest its minimum operational inertance as determined by the proximity of right variable geometry power inertance fixed boundary 18R of closure 11, and right variable geometry power inertance articulated boundary 20R of shuttle body 13. As shuttle assembly 12 moves to the right as a result of the acceleration imparted to it by the integral of the static pressure profile manifested in left variable geometry power inertance 16L, the cylindrical flow area, i.e. the control surface at any radial position of right variable geometry power inertance 16R will diminish. In its journey from periphery 19 of right variable geometry power inertance 16R to intersection 23cR of right variable geometry power inertance 16R and right power inertance 15R the working medium will accelerate. Some of the static pressure of the working medium will be converted to kinetic energy. The reduced static pressure in right variable geometry power inertance 16R will passively contribute to the net force driving shuttle assembly to the right. Eventually—at some point in the cycle—the static pressure in right acoustic formation 43R will exceed the static pressure in left acoustic formation 43L. The net force on shuttle assembly 12 will then be to the left, decelerating the rightward motion of shuttle assembly 12. Eventually—at some point in the cycle—shuttle assembly 12 will come to rest at its rightmost operating position, and thereby be positioned for combustion to take place in right combustion process acoustic capacitance 14R. Also the static pressure in right acoustic formation 43R will essentially be maximized, notably the static pressure in right combustion process acoustic capacitance 14R where the next combustion event will take place.

Earlier in this description the applicant said that a description of the exhaust portion of the intake/exhaust processes would be addressed later in this description. To wit, within the half cycle period starting wherein the static pressure in left acoustic formation 43L is maximized while the static pressure in right acoustic formation 43R is minimized, and ending wherein the static pressure in right acoustic formation 43R is maximized while the static pressure in left acoustic formation 43L is minimized, the flow of the working medium through left and right primary inertances 22L and 22R passes through several phases, because, among other factors, of the intervention of intersection 23a of left and right primary inertances 22L and 22R, and intake/exhaust primary inertance 24. As noted earlier, when the working medium is flowing to the right, and doing so at sufficient velocity so as to result in a decreased static pressure at intersection 23a of left and right primary inertances 22L and 22R and intake/exhaust primary inertance 24, intake/exhaust acoustic cluster 41 will be functioning within the intake portion of the intake/exhaust process.

Eventually, the working medium flowing to the right, as supplemented by the intake flow, will result in the increasing of the stagnation pressure in right acoustic formation 43R while the stagnation pressure in left acoustic formation 43L will be decreasing. Concomitant with this, the velocity of the working medium, supplemented by the intake flow from intersection 23a will be decelerating. This decreasing velocity will result in an increasing of the static pressure of the working medium flowing through left and right primary inertance 22L and 22R. When this static pressure exceeds the static pressure as manifested at intersection 23a of intake/exhaust primary inertance 24 and left and right primary inertance 22L and 22R, the working medium will flow radially away from intersection 23a. Initially the working medium which is flowing radially away from intersection 23a will issue from the working medium as it is flowing to the right from left primary acoustic cluster capacitance 40L, past intersection 23a, to right primary acoustic cluster capacitance 40R. However, at some time during this flowing to the right, the static pressure in right primary acoustic cluster capacitance 40R will have increased sufficiently, so that the flow from intersection 23a to right primary acoustic cluster capacitance 40R will have stopped and then reversed its direction so as to flow toward intersection 23a. For a period of time then, the working medium will be flowing from both left acoustic formation 43L and right acoustic formation 43R toward intersection 23a. The working medium converging on intersection 23a from both directions will proceed to change direction to a radial flow pattern as the working medium flows through intake/exhaust primary inertance 24, and through the intervention of the remaining acoustic elements of intake/exhaust acoustic cluster 41, eventually reach entrance 45a of intake/exhaust terminal inertance 50—where the working medium exhausts to atmosphere. This is the exhaust portion of the intake/exhaust processes, both of which take place within intake/exhaust acoustic cluster 41 during each half cycle of the A.R.E.G. or the A.R.J.E.

Focusing attention on intake/exhaust acoustic cluster 41, note that intake/exhaust primary inertance 24 serves a dual purpose. First there is the need to provide a radial flow pattern to interface with the essentially cylindrical flow pattern of left and/or right primary inertance 22L and 22R so as to facilitate the induction of flow originating at entrance 45a of intake/exhaust terminal inertance 50, and entrance 45b of intake/exhaust throttled inlet duct/diffuser 54. Second there is the need to direct the essentially cylindrical flow pattern of left and right primary inertance 22L and 22R to a radial flow pattern so as to facilitate the exhausting of mainly the products of combustion component of the working medium flowing through left and/or right primary inertance 22L and 22R during the period of each half cycle when the flow velocity through left and/or right primary inertance 22L and 22R slows sufficiently such that the static pressure rises above ambient pressure. Similarly, intake/exhaust capacitance 25 may serve a dual purpose. First there is the need to redirect the cylindrical flow pattern of intake/exhaust secondary inertance 48 to the radial flow pattern of intake/exhaust primary inertance 24 and vice versa—depending of course on whether intake/exhaust acoustic cluster 41 is engaged in its intake or its exhaust function. Second, as a capacitance the value of intake/exhaust capacitance 25, and the value of intake/exhaust primary inertance 24 in series with left and/or right primary inertance 22L and 22R can be selected so as to produce a suitable degree of resonance, so as to optimize the intake/exhaust function. On the other hand the applicant submits that depending on the detail design, intake/exhaust capacitance 25 might very well be better modeled as a secondary inertance in series with intake/exhaust primary inertance 24, rather than as a capacitance.

The steady state operation as detailed thus far tacitly assumes that the A.R.E.G. or the A.R.J.E. is not in forward motion. In such case the entrance 45b to intake/exhaust throttled inlet duct/diffuser 54 will manifest essentially ambient air in terms of pressure, temperature, and constituency. On the other hand, entrance 45a to intake/exhaust terminal inertance 50 will manifest ambient air with respect to pressure—but, will be contaminated to some degree by virtue of the fact that there will remain, in the vicinity of entrance 45a to intake/exhaust terminal inertance 50, some residual amount of the products of combustion of previous exhaust pulses. The actual amount of contamination will represent a state of equilibrium over "many" cycles. The independence of the thermodynamic states prevailing at entrance 45b to those prevailing at entrance 45a will depend primarily on the degree of spatial separation or isolation of entrance 45b and entrance 45a. Clearly one need only include duct extensions in order to optimize that distance.

On the other hand, if the A.R.E.G. or the A.R.J.E. were in forward motion (as in a vehicle in forward motion) and entrance 45b were oriented so as to directly ingest the ambient airstream, or extended ductwork were used to direct the airstream into entrance 45b, then the kinetic energy of the ambient airstream will be diffused in its passage through intake/exhaust throttled inlet duct/diffuser 54 thereby manifesting a higher static pressure at intersection 23b of intake/exhaust secondary inertance 48 and intake/exhaust array inertances 52 than when the A.R.E.G. or the A.R.J.E. is not in motion. The higher static pressure at intersection 23b will result in ambient air flowing through intake/exhaust array inertances 52 into intake/exhaust secondary inertance 48 where this ambient air will be entrained by the working medium flowing through intake/exhaust secondary inertance 48. This in turn enhances the dilution of the products of combustion contained in the working medium. The inclusion of a computer controlled mass flow rate throttle plate 74 would facilitate the controlling of the quality of the working medium which eventually reaches left or right combustion process acoustic capacitances 14L and 14R.

Previously the applicant said that subsequently the impact of the acceleration of shuttle assembly 12 on linear motor/ generator composite 29 would be discussed. To wit, as a result of the sum of the static pressure forces alternately imposed on left and right variable geometry power inertance articulated boundary 20L and 20R of shuttle assembly 12 and the alternating forces resulting from the differential area between left and right acoustic formations 43L and 43R, and shuttle assembly 12, shuttle assembly 12 will oscillate over its design amplitude. In doing so, magnetic lines of force 37 issuing from linear motor/generator armature assembly 30, which includes of a number of magnetic armature rings 38, will sweep across linear motor/generator stator windings 34, first in one direction then in the other. The passive cutting of the magnetic lines of force by the stationary linear motor/ generator stator windings 34 will generate an alternating potential and current of some profile in linear motor/ generator stator windings 34. The profile of the potential and the resulting current will depend on the design velocity profile of shuttle assembly 12. A preferred profile can be obtained by means of computer control of the fuel injection process in response to the input of sensors reading the location, and/or the velocity, and/or the acceleration of shuttle assembly 12. The electrical output of linear motor/ generator composite 29 will then be used either to charge a drive battery which will in turn drive individual electric wheel motors, or alternatively, will drive a central electric motor which will in turn drive individual wheels via mechanical means. Furthermore it is feasible to simultaneously direct the output of linear motor/generator composite 29 as well as the output of the drive battery to driving the individual electric drive wheels, or the central electric motor, in order to realize a maximization of power to the wheels.

The periodicity of the operation of the A.R.E.G. and the A.R.J.E. which introduces cooler air during each cycle limits the equilibrium or soak temperature. This fact in conjunction with the lack of rubbing components may obviate a need for a cooling system.

CONCLUSIONS, RAMIFACATIONS, AND SCOPE

Given the fact that the automobile is viewed as the most egregious of environmental villains, it would be difficult to overestimate the demand for a credible replacement for the standard internal combustion engine. The applicant submits that a credible replacement form of internal combustion engine will prevail over such anticipated replacements as the EV (electric vehicle), or the FCV (fuel cell vehicle).

The applicant submits that there are three sources from which an internal combustion engine—more significantly an internal combustion engine drive train—degrades the environment. The most obvious and most egregious is the exhaust emissions. While the applicant is not—at least not yet—prepared to assert that the emissions of the A.R.E.G. and the A.R.J.E. would be lower than any other internal combustion engine, it should be noted that the absence of lubrication does mean that the emissions of the A.R.E.G. and the A.R.J.E. would be reduced by the amount normally resulting from such lubrication. In addition, The operating temperature of the A.R.E.G. and the A.R.J.E. is not limited by the need to maintain the delicate fits as required in ICE'S. Consequently the A.R.E.G. and the A.R.J.E. would be able to operate at higher temperatures which translate into higher thermodynamic efficiencies. Additionally the applicant submits that the operating temperature could be maintained at a lower fuel consumption by insulating the acoustic components such that the thermodynamic processes are more adiabatic.

Second, in the case of the A.R.G.E., considering that there are presently on the order of 500,000,000 vehicles in the world, their lubrication dissipates and/or degrades on the order of 35,000,000 barrels of oil per year. While most of this oil is not burned and therefore does not contribute to emissions, it is either unrecoverably leaked or spilled, or must be recycled at an additional cost to the environment, to say nothing of the overt economic cost. Additionally, whereas the quantity of oil used for gasoline is on the order of 200 times that used for lubrication, the applicant speculates that the overall polluting effects of a barrel of oil dedicated to lubrication may be manyfold the polluting effects of the barrel of oil dedicated to gasoline.

Third, the applicant submits that both the economic cost and in particular the environmental cost of manufacturing a drivetrain which features the A.R.E.G. would be significantly less than those of any of the mechanically intensive drivetrains now in existence. This is so because of the simplicity of the A.R.E.G. per se, as well as the simplicity of the other components of the drivetrain. In addition, the extended life of such a drivetrain, as compared to any of the mechanically intensive drivetrains now in existence, translates into less production for an equal amount of transportation.

What is claimed is:

1. An electrical power generating apparatus comprising:
   an internal combustion acoustically resonant engine comprising:
   a left acoustic formation,
   a right acoustic formation,
   an intake/exhaust acoustic cluster,
   which are formed into an apparatus closure and constitutes a multiple degree of freedom vibratory system;
   a shuttle suspended inside and between said acoustic formations and is capable of reciprocating movement,
   two fuel injectors positioned symmetrically at each end of said shuttle in the body of said closure, and by their alternate operation are able to create oscillations of said shuttle,
   a linear generator rotor attached to said shuttle, with magnetic elements producing a magnetic field attached to said rotor and capable to reciprocate together with said shuttle,
   a linear generator stator with winding, attached to said closure,
   wherein said fuel injectors create mechanical oscillations of said shuttle, and said shuttle creates oscillations of said rotor, and said magnetic field of said rotor crosses said winding of said
   stator for generating of electrical energy.

2. An electric power generating system of claim 1 wherein said power acoustic cluster operation is defined by:
   a combustion process acoustic capacitance,
   a fixed geometry power inertance, and
   a variable geometry power inertance,
   such that the products of combustion of said combustion process acoustic capacitance are accelerated upon entering the constricted flow area of said fixed geometry power inertance, so as to convert part of the static pressure energy to the kinetic energy of flow, and said products of combustion to be conducted to the inner boundary of said variable geometry power inertance, wherein said products of combustion flow radially through said variable geometry power inertance to the periphery of said variable geometry power inertance during which part of the kinetic energy of flow is reconverted to static pressure, wherein the superposition of said reconverted static pressure, and a static pressure component prevailing prior to the deceleration of said products of combustion, in concert with the changes in momentum undertaken by said products of combustion during said products of combustion conduction through said variable geometry power inertance, accelerates the shuttle assembly.

3. An electric power generating system of claim 2 wherein said combustion process acoustic capacitances' geometric configuration, suffering no constraints vis-a-vis articulated components, such that said combustion process acoustic capacitances are configured in the interest of maximizing the efficiency of the thermodynamic processes.

4. The fixed geometry power inertance of claim 2 wherein said fixed geometry power inertance, bridges the combustion process acoustic capacitance and the variable geometry power inertance, so as to convert the elevated static pressure of the working medium, resulting of the periodic combustion within the combustion process acoustic capacitance, to the kinetic energy of velocity.

5. The fixed geometry power inertance of claim 2 wherein the impedance resulting of said inertance, contributes to the containment of the combustible charge to the combustion process acoustic capacitance for a period of time, such that the combustion process is sufficiently complete, in the interest of overall engine efficiency.

6. The variable geometry power inertance of claim 2 wherein the variable geometry power inertance comprising:

a variable volume of space wherein said volume and consequent inertance is nominally dependent on:

the proximity of the variable geometry power inertance articulated boundary to the variable geometry power inertance fixed boundary, said boundaries providing the pressure reactive surfaces throuh which the energy of combustion, through the intervention of the fixed geometry power inertance and said variable geometry power inertance, is converted to the kinetic energy of the shuttle assembly, and subsequently, through the intervention of the linear motor/generator composite, to electrical energy.

7. The variable geometry power inertance of claim 2 wherein both the fixed and the articulated pressure reactive surfaces, which, by virtue of their geometry, and, by the mobility of the articulated surface which is a part of the shuttle body, convert part of the kinetic energy of the products of combustion issuing from the fixed geometry power inertance of claim 2 to static pressure, which is then converted to the kinetic energy of the shuttle assembly, and subsequently, through the intervention of the linear motor/generator composite, to electrical energy.

8. The acoustically resonant engine of claim 1 wherein the acoustic formations each include a primary acoustic cluster, wherein said primary acoustic clusters each include a primary acoustic cluster capacitance, and a primary inertance, such that said primary acoustic cluster capacitances each provide a bridging capacitance between their respective variable geometry power inertance and primary inertance.

9. The primary acoustic cluster capacitances of claim 8 wherein said primary acoustic cluster capacitances are comprised of:

a scroll acoustic capacitance component, a transition capacitance component, wherein:

said components manifest no specific common boundary, and consequently coalese both physically and acoustically, said components functioning essentially as a single capacitance, wherein said primary acoustic cluster capacitances serve as the primary seats of capacitive reactive power of their respective acoustic formations.

10. The primary inertances of claim 8 wherein said primary inertances, comprise one or several acoustic inertances arranged in:

series, parallel, or conjunctions of both series and parallel, serve as the primary seats of inertive reactive power of their respective acoustic formations, wherein one terminal of said arrangements interface with their respective primary acoustic cluster capacitance, while the opposing terminal of said arrangements interface each with the other, while said opposing terminals jointly interface with an intake/exhaust acoustic cluster.

11. The primary inertances of claim 8 wherein the opposing terminal edges of said primary inertances, by virtue of their detail design configurations, efficiently conduct the working medium, one to the other, transverse to the intake/exhaust primary inertance.

12. The acoustically resonant engine of claim 1 wherein an intake/exhaust acoustic cluster comprising a group of acoustic elements, said group of acoustic elements providing the means of alternately performing both the intake and exhaust functions.

13. The intake/exhaust acoustic cluster of claim 12 wherein said intake/exhaust acoustic cluster operation is defined by:

an intake/exhaust primary inertance, an intake/exhaust capacitance, an intake/exhaust secondary inertance, an intake/exhaust array inertance, an intake/exhaust throttled inlet duct/diffuser an intake/exhaust terminal inertance, such that during the intake phase of said intake/exhaust acoustic cluster the products of combustion issuing from either a left or right acoustic formation, as the case may be, and subsequently issuing from the terminal edges of the primary inertance of said acoustic formation, having been accelerated by the high pressure of combustion in conjunction with the constricted flow area of said primary inertance, manifests, for a period of time, a static pressure below ambient, such that essentially ambient air residing within said intake/exhaust primary inertance is entrained by said products of combustion, whereby an intake/exhaust capacitance comprising a seat of capacitive reactive power resupplies said intake/exhaust primary inertance with essentially ambient air, whereby an intake/exhaust secondary inertance comprising a seat of inertive reactive power resupplies said intake/exhaust capacitance with essentially ambient air, said essentially ambient air having been inducted partially from two confluent sources, the first of said confluent sources being an intake/exhaust terminal inertance, wherein said intake/exhaust terminal inertance inducts essentially ambient air from the surrounding environment:

while the second of said confluent sources, an intake/exhaust array inertance, said intake/exhaust array inertance comprising an array of inertances arrayed in series, or parallel, and/or series and parallel, respond to the lower static pressure of aforementioned products of combustion being conducted through aforementioned intake/exhaust secondary inertance by providing a path by means of which essentially ambient air is entrained by the aforementioned products of combustion passing through said intake/exhaust secondary inertance, said essentially ambient air being supplied by an intake/exhaust throttled inlet duct/diffuser said intake/exhaust throttled inlet duct/diffuser having inducted essentially ambient air from the environment either statically or under ram conditions, whereas, such that during the intake phase of said intake/exhaust acoustic cluster the products of combustion issuing from either a left or right acoustic formation, as the case may be, and subsequently issuing from the terminal edges of the primary inertance of said acoustic formation, having been accelerated by the high pressure of combustion in conjunction with the constricted flow area of said primary inertance, manifests, for a period of time, a static pressure below ambient, such that essentially ambient air residing within said intake/exhaust primary inertance is entrained by said products of combustion, whereby an intake/exhaust capacitance comprising a seat of capacitive reactive power resupplies said intake/exhaust primary inertance with essentially ambient air, whereby an intake/exhaust secondary inertance comprising a seat of inertive reactive power resupplies said intake/exhaust capacitance with essentially ambient air, said essentially ambient air having been inducted partially from two confluent sources, the first of said confluent sources being an intake/exhaust terminal inertance, wherein said intake/exhaust terminal inertance inducts essentially ambient air from the surrounding environment:

while the second of said confluent sources, an intake/exhaust array inertance, said intake/exhaust array inertance comprising an array of diffusers arrayed in series, or parallel, and/or series and parallel, respond to the lower static pressure of aforementioned products of combustion being conducted through aforementioned intake/exhaust secondary inertance by providing a path by means of which essentially ambient air is entrained by the aforementioned products of combustion passing through said intake/exhaust secondary inertance, said essentially ambient air being supplied by an intake/exhaust throttled inlet duct/diffuser said intake/exhaust throttled inlet duct/diffuser having inducted essentially ambient air from the environment either statically or under ram conditions, whereas, during the exhaust phase of said intake/exhaust acoustic cluster the products of combustion issuing from the aformentioned acoustic formation, and subsequently issuing from the terminal edges of the primary inertance of said acoustic formation, having been decelerated by virtue of the increasing static pressure of the aforementioned mixture accumulating in the opposing acoustic formation, manifests, for a period of time, a static pressure above ambient, such that a portion of the aforementioned products of combustion, and eventually a portion of the aformentioned enriched mixture, will converge at an intersection of said primary inertance and intake/exhaust primary inertance, such that a portion of the aforementioned products of combustion as well as a portion of the enriched mixture, flows into said intake/exhaust primary inertance, whereby said fluids are conducted to said intake/exhaust capacitance, comprising a seat of capacitive reactive power, whereas said fluids are conducted to said intake/exhaust secondary inertance comprising a seat of inertive reactive power, wherein said fluids are conducted primarily, if not exclusively, to said intake/exhaust terminal inertance depending on the static pressure of said fluids as well as the degree of the aformentioned ram pressure, such that in flowing through said intake/exhaust secondary inertance the aformentioned fluids will entrain additional ambient air as provided by flow from said intake/exhaust array inertance, wherein said additional ambient air originates in said intake/exhaust throttled inlet duct/diffuser.

14. The intake/exhaust primary inertance of claim 13 wherein said intake/exhaust primary inertance provides a flow path for the products of combustion, away from the primary inertances during the exhaust process, and toward the primary inertances during the intake process.

15. The intake/exhaust capacitance of claim 13 wherein said intake/exhaust capacitance collects the products of combustion, and redirects said products of combustion to an intake/exhaust secondary inertance during an exhaust phase of a cycle, followed by an intake phase of a cycle wherein said intake/exhaust capacitance redirects essentially ambient air to said intake/exhaust primary inertance, as said essentially ambient air issues from intake/exhaust secondary inertance.

16. The intake/exhaust secondary inertance of claim 13 wherein, during the exhaust phase of a cycle, said intake/exhaust secondary inertance, by means of its constriction, accelerates the products of combustion, as said products of combustion flow to, and through, the confluence of the essentially perpendicularly disposed intake/exhaust array inertance, and the essentially colinearly disposed intake/exhaust terminal inertance, such that the products of combustion, in passing by the intake/exhaust array inertance, entrains essentially ambient air, as said ambient air passesthrough the intake/exhaust array inertance, whereas said essentially ambient air had issued form intake/exhaust throttled inlet duct/diffuser, whereupon the resulting mixture flows through an intake/exhaust terminal inertance to the immediate environment, whereupon, having completed the exhaust phase of the cycle, the flow through the intake/exhaust secondary inertance, having entered the intake phase of the cycle reverses its direction, being supplied by the intake/exhaust terminal inertance, as well as by the entrainment of essentially ambient air through the intake/exhaust array inertance, said mixture issuing from the intake/exhaust throttled inlet duct/diffuser, wherein said mixture originated in the local environment, said mixture entering the intake/exhaust capacitance, subsequently inducted by the intake/exhaust primary inertance, and in turn, entrained by the flow through the primary inertance.

17. The intake/exhaust array inertance of claim 13 wherein said intake/exhaust array inertance consists of one or more inertance arranged in parallel, or series, or parallel and series, which collectively provide communication between the intake/exhaust secondary inertance and the intake exhaust throttled inlet duct diffuser, such that said communication results in the entrainment of additional ambient air, so as to enhance the quality of the combustible charge in the case of the intake phase, and so as to enhance the diffusion of the products of combustion in the vicinity of the intake/exhaust terminal inertance in the case of the exhaust phase of the cycle.

18. An intake/exhaust throttled inlet duct/diffuser of claim 13 wherein a computer controlled throttle plate meters the quantity of ambient air which is ingested in support of combustion, as well as in the maintenance of the reactive power resident in the system.

19. A mechanical, acoustically motivated, oscillating shuttle of claim 1, inductively coupled to electrical coiling such as to convert the absorbed acoustical energy to an output of electrical energy during steady state operation, and, alternatively, such as to convert inductively absorbed electrical energy to the kinetic energy of velocity of said shuttle, subsequently to be converted to the acoustical energy of a working medium during startup.

20. The shuttle of claim 1 wherein the longitudinal extremes of said shuttle comprise the surfaces which serve as the articulated boundaries of a variable power inertance.

21. The shuttle of claim 1 wherein permanent magnet armature components are attached to said shuttle by some means, as well as electrically isolated from said shuttle by some means.

22. The shuttle of claim 1 wherein said shuttle may be fitted with sensors, providing input to a computer controlled feedback system for controlling operational parameters.

23. Flexible suspension diaphragm assemblies of claim 1 wherein said flexible suspension diaphragm assemblies join the articulating capable shuttle to the fixed apparatus closure, such that the essential concentricity of the shuttle with respect to the closure is maintained, while simultaneouly maintaining the essential concentricity of the motor generator armature with respect to the linear motor generator stator.

24. Flexible suspension diaphragm assemblies of claim 1 wherein the flexible components may be fabricated of one or more flexible elements, each fabricated of one or more types of material, not to exclude replications or variations of motor vehicle tire construction.

25. An embodiment of claim 1, herein known as an A.R.J.E., in which the output shall consist of two forms of useful energy, wherein a minor portion of the output energy may be in the form of electrical energy as required, for example, for auxiliary power in aircraft, while the major portion of the output energy would be in the form of a high energy jet.

26. The embodiment of claim 25 wherein said A.R.J.E. includes an intake/exhaust acoustic cluster, wherein said intake/exhaust acoustic cluster specifically includes subsonic, transonic, and supersonic capable components.

27. The embodiment of claim 1 wherein the compression and rarefaction processes of a working medium, as postured for intake, combustion, and exhaust, is a result of acoustic resonances as well as flow energies, as initiated primarily by the combustion process.

28. The embodiment of claim 25 wherein the compression and rarefaction processes of a working medium, as postured for intake, combustion, and exhaust, is a result of acoustic resonances as well as flow energies, as initiated primarily by the combustion prcocess.

29. The linear motor generator of claim 1 wherein a stator assembly may include a winding, such that, in response to the feedback issuing from the shuttle, said winding would interact with the shuttle armature so as to either retard, or promote the motion of the shuttle, in order to optimize performance.

30. The electric power generating apparatus of claim 1 wherein a drive train comprising:

said electric power generating apparatus, complemented by one or more electric drive motors, complemented by an electrical storage device such as batteries, or capacitors, complemented by electrical inverters or converters, complemented by computer controls, such that a vehicle is propelled by said electric power generating apparatus, as complemented.

31. The internal combustion acoustically resonant engine of claim 1 wherein said engine may or may not be lubricated.

32. The internal combustion acoustically resonant engine of claim 1 wherein said engine's thermodynamic cycle overtly includes nonsteady state thermodynamic processes.

33. The mechanical, acoustically motivated, oscillating shuttle of claim 1 wherein the surfaces which comprise the articulated boundaries of variable geometry power inertances, may be formed so as to direct the flow of the working medium, such that said oscillating shuttle is also motivated by a change of momentum of said working medium, such that said oscillating shuttle also functions as a linear turbine.

34. The embodiment of claim 1 wherein the compression and rarefaction processes of a working medium, as postured for intake, combustion, and exhaust, is a result of acoustic resonances as well as flow energies, as initiated primarily by the combustion process.

* * * * *